United States Patent
Ell

(10) Patent No.: US 12,043,906 B2
(45) Date of Patent: *Jul. 23, 2024

(54) ASSEMBLIES AND METHODS FOR MONITORING CATHODIC PROTECTION OF STRUCTURES

(71) Applicant: MARATHON PETROLEUM COMPANY LP, Findlay, OH (US)

(72) Inventor: Ryan Grant Ell, Findlay, OH (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/369,297

(22) Filed: Sep. 18, 2023

(65) Prior Publication Data

US 2024/0003016 A1    Jan. 4, 2024

Related U.S. Application Data

(60) Continuation of application No. 17/886,178, filed on Aug. 11, 2022, now Pat. No. 11,807,945, which is a
(Continued)

(51) Int. Cl.
*C23F 13/22* (2006.01)
*G01N 17/04* (2006.01)

(52) U.S. Cl.
CPC ........... *C23F 13/22* (2013.01); *G01N 17/046* (2013.01)

(58) Field of Classification Search
CPC .............................. C23F 13/22; G01N 17/046
See application file for complete search history.

(56) References Cited

U.S. PATENT DOCUMENTS 2,626,627 A    1/1953 Jung et al.
2,864,252 A    12/1958 Schaschl
(Continued)

FOREIGN PATENT DOCUMENTS

AU    2010241217    11/2010
AU    2013202839    5/2014
(Continued)

OTHER PUBLICATIONS

Skelton et al., Onboard Refueling Vapor Recovery Systems Analysis of Widespread Use, Nescaum, Boston MA, Aug. 20, 2007.
(Continued)

*Primary Examiner* — Jeff W Natalini
(74) *Attorney, Agent, or Firm* — Womble Bond Dickinson (US) LLP

(57) ABSTRACT

Assemblies and methods for monitoring the cathodic protection of underground or submerged structures may include a coupon assembly including a conductive test coupon and a reference electrode for determining the voltage potential difference of the protected structure without substantially interrupting surrounding current sources. The reference electrode may be at least partially covered with an electrolytic material in electrical contact with the surrounding environment via a plug including a porous material. A method of installation of the assembly may allow a single technician to install the coupon assembly using a probe rod without extensive on-site excavation. The coupon assembly may be configured to seat securely with the probe rod for stability during installation, and release from the probe rob when the probe rod is separated from the coupon assembly and withdrawn from the ground, leaving the coupon assembly at a preselected depth or preselected distance from the protected structure.

13 Claims, 8 Drawing Sheets

Related U.S. Application Data division of application No. 17/805,801, filed on Jun. 7, 2022, now Pat. No. 11,447,877.

(60) Provisional application No. 63/365,102, filed on May 20, 2022, provisional application No. 63/260,622, filed on Aug. 26, 2021.

(56) References Cited

U.S. PATENT DOCUMENTS

| | | |
|---|---|---|
| 3,087,311 A | 4/1963 | Rousseau |
| 3,303,525 A | 2/1967 | Peoples |
| 3,398,071 A | 8/1968 | Bagno |
| 3,504,686 A | 4/1970 | Cooper et al. |
| 3,593,555 A | 7/1971 | Grosko |
| 3,608,869 A | 9/1971 | Woodle |
| 3,672,180 A | 6/1972 | Davis |
| 3,725,669 A | 4/1973 | Tatum |
| 3,807,433 A | 4/1974 | Byrd |
| 3,809,113 A | 5/1974 | Grove |
| 3,925,592 A * | 12/1975 | Webb ............... H05K 5/06 220/228 |
| 3,961,493 A | 6/1976 | Nolan, Jr. |
| 4,010,779 A | 3/1977 | Pollock et al. |
| 4,073,303 A | 2/1978 | Foley, Jr. |
| 4,109,677 A | 8/1978 | Burnside |
| 4,202,351 A | 5/1980 | Biche |
| 4,229,064 A | 10/1980 | Vetter et al. |
| 4,242,533 A | 12/1980 | Cott |
| 4,289,163 A | 9/1981 | Pierson |
| 4,294,378 A | 10/1981 | Rabinovich |
| 4,320,775 A | 3/1982 | Stirling et al. |
| 4,357,576 A | 11/1982 | Hickam et al. |
| 4,420,008 A | 12/1983 | Shu |
| 4,457,037 A | 7/1984 | Rylander |
| 4,481,474 A | 11/1984 | Gerrit |
| 4,488,570 A | 12/1984 | Jiskoot |
| 4,630,685 A | 12/1986 | Huck et al. |
| 4,690,587 A * | 9/1987 | Petter ............... C23F 13/04 204/196.07 |
| 4,744,305 A | 5/1988 | Lim et al. |
| 4,788,093 A | 11/1988 | Murata et al. |
| 4,794,331 A | 12/1988 | Schweitzer, Jr. |
| 4,848,082 A | 7/1989 | Takahashi |
| 4,897,226 A | 1/1990 | Hoyle et al. |
| 4,904,932 A | 2/1990 | Schweitzer, Jr. |
| 4,964,732 A | 10/1990 | Cadeo et al. |
| 5,050,064 A | 9/1991 | Mayhew |
| 5,095,977 A | 3/1992 | Ford |
| 5,129,432 A | 7/1992 | Dugger |
| 5,191,537 A | 3/1993 | Edge |
| 5,367,882 A | 11/1994 | Lievens et al. |
| 5,383,243 A | 1/1995 | Thacker |
| 5,469,830 A | 11/1995 | Gonzalez |
| 5,533,912 A | 7/1996 | Fillinger |
| 5,562,133 A | 10/1996 | Mitchell |
| 5,595,709 A | 1/1997 | Klemp |
| 5,603,360 A | 2/1997 | Teel |
| 5,627,749 A | 5/1997 | Waterman et al. |
| 5,661,623 A | 8/1997 | McDonald |
| 5,783,916 A | 7/1998 | Blackburn |
| 5,814,982 A | 9/1998 | Thompson et al. |
| 5,832,967 A | 11/1998 | Andersson |
| 5,873,916 A | 2/1999 | Cemenska et al. |
| 5,895,347 A | 4/1999 | Doyle |
| 5,906,648 A | 5/1999 | Zoratti et al. |
| 5,906,877 A | 5/1999 | Popper et al. |
| 5,939,166 A | 8/1999 | Cheng et al. |
| 5,962,774 A | 10/1999 | Mowry |
| 5,973,593 A | 10/1999 | Botella |
| 5,993,054 A | 11/1999 | Tan et al. |
| 6,022,421 A | 2/2000 | Bath |
| 6,050,844 A | 4/2000 | Johnson |
| 6,065,903 A | 5/2000 | Doyle |
| 6,077,340 A | 6/2000 | Doyle |
| 6,077,418 A | 6/2000 | Iseri et al. |
| 6,098,601 A | 8/2000 | Reddy |
| 6,111,021 A | 8/2000 | Nakahama et al. |
| 6,149,351 A | 11/2000 | Doyle |
| 6,186,193 B1 | 2/2001 | Phallen et al. |
| 6,243,483 B1 | 6/2001 | Petrou et al. |
| 6,333,374 B1 | 12/2001 | Chen |
| 6,346,813 B1 | 2/2002 | Kleinberg |
| 6,383,237 B1 | 5/2002 | Langer et al. |
| 6,427,384 B1 | 8/2002 | Davis, Jr. |
| 6,478,353 B1 | 11/2002 | Barrozo |
| 6,679,302 B1 | 1/2004 | Mattingly et al. |
| 6,719,921 B2 | 4/2004 | Steinberger et al. |
| 6,799,883 B1 | 10/2004 | Urquhart et al. |
| 6,834,531 B2 | 12/2004 | Rust |
| 6,840,292 B2 | 1/2005 | Hart et al. |
| 6,851,916 B2 | 2/2005 | Schmidt |
| 6,980,647 B1 | 12/2005 | Daugherty et al. |
| 6,987,877 B2 | 1/2006 | Paz-Pujalt et al. |
| 7,032,629 B1 | 4/2006 | Mattingly et al. |
| 7,091,421 B2 | 8/2006 | Kukita et al. |
| 7,186,321 B2 | 3/2007 | Benham |
| 7,258,710 B2 | 8/2007 | Caro et al. |
| 7,275,366 B2 | 10/2007 | Powell et al. |
| 7,294,913 B2 | 11/2007 | Fischer et al. |
| 7,385,681 B2 | 6/2008 | Ninomiya et al. |
| 7,444,996 B2 | 11/2008 | Potier |
| 7,459,067 B2 | 12/2008 | Dunn et al. |
| 7,564,540 B2 | 7/2009 | Paulson |
| 7,631,671 B2 | 12/2009 | Mattingly et al. |
| 7,729,561 B1 | 6/2010 | Boland et al. |
| 7,749,308 B2 | 7/2010 | McCully |
| 7,810,988 B2 | 10/2010 | Kamimura et al. |
| 7,815,744 B2 | 10/2010 | Abney et al. |
| 7,832,338 B2 | 11/2010 | Caro et al. |
| 7,879,204 B2 | 2/2011 | Funahashi |
| 8,075,651 B2 | 12/2011 | Caro et al. |
| 8,282,265 B2 | 10/2012 | Breithhaupt |
| 8,299,811 B2 | 10/2012 | Wing |
| 8,312,584 B2 | 11/2012 | Hodde |
| 8,327,631 B2 | 12/2012 | Caro et al. |
| 8,368,405 B2 | 2/2013 | Siebens |
| 8,376,432 B1 | 2/2013 | Halger et al. |
| 8,402,746 B2 | 3/2013 | Powell et al. |
| 8,413,484 B2 | 4/2013 | Lubkowitz |
| 8,414,781 B2 | 4/2013 | Berard |
| 8,577,518 B2 | 11/2013 | Linden et al. |
| 8,597,380 B2 | 12/2013 | Buchanan |
| 8,632,359 B2 | 1/2014 | Grimm |
| 8,647,162 B2 | 2/2014 | Henriksson et al. |
| 8,748,677 B2 | 6/2014 | Buchanan |
| 8,808,415 B2 | 8/2014 | Caro et al. |
| 8,979,982 B2 | 3/2015 | Jordan et al. |
| 9,038,855 B2 | 5/2015 | Lurcott et al. |
| 9,162,944 B2 | 10/2015 | Bennett et al. |
| 9,175,235 B2 | 11/2015 | Kastner |
| 9,222,480 B2 | 12/2015 | Younes et al. |
| 9,310,016 B2 | 4/2016 | Hodde |
| 9,329,066 B2 | 5/2016 | Skarping |
| 9,363,462 B2 | 6/2016 | Yoel |
| 9,388,350 B2 | 7/2016 | Buchanan |
| 9,518,693 B2 | 12/2016 | Hodde |
| 9,550,247 B2 | 1/2017 | Smith |
| 9,643,135 B1 | 5/2017 | Mazzei et al. |
| 9,945,333 B2 | 4/2018 | Kopinsky |
| 10,001,240 B1 | 6/2018 | Dray et al. |
| 10,012,340 B1 | 7/2018 | Dray et al. |
| 10,024,768 B1 | 7/2018 | Johnsen |
| 10,094,508 B1 | 10/2018 | Dray et al. |
| 10,168,255 B1 | 1/2019 | Johnsen |
| 10,196,243 B1 | 2/2019 | Wells |
| 10,197,206 B1 | 2/2019 | Dray et al. |
| 10,247,643 B1 | 4/2019 | Johnsen |
| 10,261,279 B1 | 4/2019 | Potter |
| 10,287,940 B2 | 5/2019 | Tonsich |
| 10,345,221 B1 | 7/2019 | Silverman |
| 10,364,718 B2 | 7/2019 | Eddaoudi et al. |
| 10,386,260 B2 | 8/2019 | Dudek |
| 10,408,377 B1 | 9/2019 | Dray et al. |

(56) References Cited

U.S. PATENT DOCUMENTS

| | | |
|---|---|---|
| 10,486,946 B1 | 11/2019 | Wells |
| 10,501,385 B1 | 12/2019 | Buckner et al. |
| 10,563,555 B2 | 2/2020 | Hamad |
| 10,570,581 B2 | 2/2020 | Faivre |
| 10,605,144 B2 | 3/2020 | Kobayashi |
| 10,633,830 B2 | 4/2020 | Shibamori |
| 10,655,774 B1 | 5/2020 | Dray et al. |
| 10,657,443 B2 | 5/2020 | Araujo et al. |
| 10,688,686 B2 | 6/2020 | Fadhel et al. |
| 10,756,459 B2 | 8/2020 | Jongsma |
| 10,833,434 B1 | 11/2020 | Tassell, Jr. |
| 10,943,357 B2 | 3/2021 | Badawy et al. |
| 10,948,471 B1 | 3/2021 | MacMullin et al. |
| 10,953,960 B1 | 3/2021 | Sharp |
| 10,962,437 B1 | 3/2021 | Nottrott et al. |
| 10,970,927 B2 | 4/2021 | Sharp |
| 10,990,114 B2 | 4/2021 | Miller |
| 10,997,707 B1 | 5/2021 | Katz et al. |
| 11,010,608 B2 | 5/2021 | Adam et al. |
| 11,112,308 B2 | 9/2021 | Kreitinger et al. |
| 11,125,391 B2 | 9/2021 | Al Khowaiter et al. |
| 11,132,008 B2 | 9/2021 | Miller |
| 11,164,406 B2 | 11/2021 | Meroux et al. |
| 11,221,107 B2 | 1/2022 | Du et al. |
| 11,247,184 B2 | 2/2022 | Miller |
| 11,325,687 B1 | 5/2022 | Sharp |
| 11,332,070 B2 | 5/2022 | Holden et al. |
| 11,345,455 B2 | 5/2022 | Sharp |
| 11,416,012 B2 | 8/2022 | Miller |
| 11,428,600 B2 | 8/2022 | Dankers et al. |
| 11,428,622 B2 | 8/2022 | Borin et al. |
| 11,447,877 B1 | 9/2022 | Ell |
| 11,559,774 B2 | 1/2023 | Miller |
| 11,565,221 B2 | 1/2023 | Miller |
| 11,578,638 B2 | 2/2023 | Thobe |
| 11,578,836 B2 | 2/2023 | Thobe |
| 11,596,910 B2 | 3/2023 | Miller |
| 11,607,654 B2 | 3/2023 | Miller |
| 11,655,748 B1 | 5/2023 | Thobe |
| 11,655,940 B2 | 5/2023 | Thobe |
| 11,662,750 B2 | 5/2023 | Miller |
| 11,686,070 B1 | 6/2023 | Jordan et al. |
| 11,715,950 B2 | 8/2023 | Miller et al. |
| 11,720,526 B2 | 8/2023 | Miller et al. |
| 11,739,679 B2 | 8/2023 | Thobe |
| 11,752,472 B2 | 9/2023 | Miller |
| 11,754,225 B2 | 9/2023 | Thobe |
| 11,774,042 B2 | 10/2023 | Thobe |
| 11,794,153 B2 | 10/2023 | Miller |
| 11,807,945 B2 | 11/2023 | Ell |
| 11,808,013 B1 | 11/2023 | Jordan et al. |
| 11,815,227 B2 | 11/2023 | Thobe |
| 11,920,504 B2 | 3/2024 | Thobe |
| 11,965,317 B2 | 4/2024 | Jordan |
| 2002/0014068 A1 | 2/2002 | Mittricker et al. |
| 2002/0178806 A1 | 12/2002 | Valentine |
| 2003/0041518 A1 | 3/2003 | Wallace et al. |
| 2003/0121481 A1 | 7/2003 | Dodd et al. |
| 2003/0158630 A1 | 8/2003 | Pham et al. |
| 2003/0167660 A1 | 9/2003 | Kondou |
| 2003/0178994 A1 | 9/2003 | Hurlimann et al. |
| 2003/0188536 A1 | 10/2003 | Mittricker |
| 2003/0197622 A1 | 10/2003 | Reynard et al. |
| 2003/0227821 A1 | 12/2003 | Bae et al. |
| 2004/0057334 A1 | 3/2004 | Wilmer et al. |
| 2004/0058597 A1 | 3/2004 | Matsuda |
| 2004/0067126 A1 | 4/2004 | Schmidt |
| 2004/0125688 A1 | 7/2004 | Kelley et al. |
| 2004/0249105 A1 | 12/2004 | Nolte et al. |
| 2004/0265653 A1 | 12/2004 | Buechi et al. |
| 2005/0007450 A1 | 1/2005 | Hill et al. |
| 2005/0058016 A1 | 3/2005 | Smith et al. |
| 2005/0146437 A1 | 7/2005 | Ward |
| 2005/0150820 A1 | 7/2005 | Guo |
| 2005/0154132 A1 | 7/2005 | Hakuta et al. |
| 2005/0284333 A1 | 12/2005 | Falkiewicz |
| 2006/0125826 A1 | 6/2006 | Lubkowitz |
| 2006/0278304 A1 | 12/2006 | Mattingly et al. |
| 2007/0175511 A1 | 8/2007 | Doerr |
| 2008/0092625 A1 | 4/2008 | Hinnrichs |
| 2008/0113884 A1 | 5/2008 | Campbell et al. |
| 2008/0115834 A1 | 5/2008 | Geoffrion et al. |
| 2008/0149481 A1 | 6/2008 | Hurt |
| 2008/0283083 A1 | 11/2008 | Piao |
| 2009/0009308 A1 | 1/2009 | Date et al. |
| 2009/0107111 A1 | 4/2009 | Oliver |
| 2009/0175738 A1 | 7/2009 | Shaimi |
| 2009/0183498 A1 | 7/2009 | Uchida et al. |
| 2009/0188565 A1 | 7/2009 | Satake |
| 2009/0197489 A1 | 8/2009 | Caro |
| 2010/0031825 A1 | 2/2010 | Kemp |
| 2010/0049410 A1 | 2/2010 | McKee |
| 2010/0058666 A1 | 3/2010 | Kim |
| 2010/0198775 A1 | 8/2010 | Rousselle |
| 2011/0265449 A1 | 11/2011 | Powell |
| 2012/0027298 A1 | 2/2012 | Dow |
| 2012/0092835 A1 | 4/2012 | Miller |
| 2012/0143560 A1 | 6/2012 | Tabet et al. |
| 2012/0185220 A1 | 7/2012 | Shippen |
| 2012/0276379 A1 | 11/2012 | Daniels et al. |
| 2012/0304625 A1 | 12/2012 | Daikoku |
| 2013/0035824 A1 | 2/2013 | Nakamura |
| 2013/0048094 A1 | 2/2013 | Ballantyne |
| 2013/0062258 A1 | 3/2013 | Ophus |
| 2013/0125323 A1 | 5/2013 | Henderson |
| 2013/0176656 A1 | 7/2013 | Kaisser |
| 2013/0186671 A1 | 7/2013 | Theis |
| 2013/0201025 A1 | 8/2013 | Kamalakannan et al. |
| 2013/0245524 A1 | 9/2013 | Schofield |
| 2013/0293884 A1 | 11/2013 | Lee et al. |
| 2013/0299500 A1 | 11/2013 | McKinnon |
| 2014/0002639 A1 | 1/2014 | Cheben et al. |
| 2014/0008926 A1 | 1/2014 | Allen |
| 2014/0062490 A1 | 3/2014 | Neuman et al. |
| 2014/0090379 A1 | 4/2014 | Powell et al. |
| 2014/0121622 A1 | 5/2014 | Jackson et al. |
| 2014/0158616 A1 | 6/2014 | Govind et al. |
| 2014/0158632 A1 | 6/2014 | Govind et al. |
| 2014/0171538 A1 | 6/2014 | Daniels et al. |
| 2014/0176344 A1 | 6/2014 | Littlestar |
| 2014/0190691 A1 | 7/2014 | Vinegar |
| 2014/0194657 A1 | 7/2014 | Wadhwa et al. |
| 2014/0299039 A1 | 10/2014 | Trollux |
| 2014/0345370 A1 | 11/2014 | Marotta |
| 2014/0356707 A1 | 12/2014 | Kwon et al. |
| 2015/0081165 A1 | 3/2015 | Yamashita et al. |
| 2015/0144468 A1 | 5/2015 | Skolozdra |
| 2015/0183102 A1 | 7/2015 | Breschi et al. |
| 2015/0198518 A1 | 7/2015 | Borin et al. |
| 2015/0244087 A1 | 8/2015 | Wing |
| 2015/0323119 A1 | 11/2015 | Giunta |
| 2016/0091467 A1 | 3/2016 | Morris |
| 2016/0139355 A1 | 5/2016 | Petersen |
| 2016/0169098 A1 | 6/2016 | Makita |
| 2016/0169436 A1 | 6/2016 | Sander et al. |
| 2016/0175634 A1 | 6/2016 | Radian |
| 2016/0238194 A1 | 8/2016 | Adler et al. |
| 2016/0252650 A1 | 9/2016 | Hirst, Sr. |
| 2016/0363249 A1 | 12/2016 | Disher |
| 2016/0369930 A1 | 12/2016 | Poe et al. |
| 2017/0051472 A1 | 2/2017 | Mochimaru |
| 2017/0088401 A1 | 3/2017 | Clements et al. |
| 2017/0122174 A1 | 5/2017 | Patel |
| 2017/0131728 A1 | 5/2017 | Lambert et al. |
| 2017/0158303 A1 | 6/2017 | Michaelis et al. |
| 2017/0248569 A1 | 8/2017 | Lambert et al. |
| 2017/0253737 A1 | 9/2017 | Auld et al. |
| 2017/0253738 A1 | 9/2017 | Auld et al. |
| 2017/0253806 A1 | 9/2017 | Auld et al. |
| 2017/0254481 A1 | 9/2017 | Cadogan et al. |
| 2017/0259229 A1 | 9/2017 | Chou et al. |
| 2017/0306428 A1 | 10/2017 | Helgason et al. |
| 2017/0326474 A1 | 11/2017 | Olovsson |
| 2017/0367346 A1 | 12/2017 | Rees et al. |

(56) References Cited

U.S. PATENT DOCUMENTS

| | | |
|---|---|---|
| 2018/0002617 A1 | 1/2018 | Umansky et al. |
| 2018/0003116 A1 | 1/2018 | Fersman et al. |
| 2018/0037452 A1 | 2/2018 | Gray et al. |
| 2018/0080356 A1 | 3/2018 | Fukui |
| 2018/0098137 A1 | 4/2018 | Saha |
| 2018/0119882 A1 | 5/2018 | Allidieres et al. |
| 2018/0143734 A1 | 5/2018 | Ochenas et al. |
| 2018/0186528 A1 | 7/2018 | Tonn |
| 2018/0218214 A1 | 8/2018 | Pestun |
| 2018/0223202 A1 | 8/2018 | Fransham et al. |
| 2018/0245313 A1 | 8/2018 | Shibamori et al. |
| 2018/0259064 A1 | 9/2018 | McLemore |
| 2018/0312391 A1 | 11/2018 | Borg |
| 2019/0016963 A1 | 1/2019 | Auld et al. |
| 2019/0121373 A1 | 4/2019 | Panigrahi |
| 2019/0367732 A1 | 5/2019 | Helgason et al. |
| 2019/0270500 A1 | 9/2019 | Hamaoka |
| 2019/0338203 A1 | 11/2019 | Umansky et al. |
| 2019/0359899 A1 | 11/2019 | Umansky et al. |
| 2019/0362147 A1 | 11/2019 | Adam |
| 2019/0136060 A1 | 12/2019 | Helgason et al. |
| 2019/0368054 A1 | 12/2019 | Gummow et al. |
| 2019/0368156 A1 | 12/2019 | Faivre |
| 2020/0033252 A1 | 1/2020 | Borin et al. |
| 2020/0118413 A1 | 4/2020 | Kanukurthy et al. |
| 2020/0232191 A1 | 7/2020 | Prior |
| 2020/0240588 A1 | 7/2020 | Al Khowaiter |
| 2020/0245551 A1 | 8/2020 | Hoffman et al. |
| 2020/0245552 A1 | 8/2020 | Hoffman et al. |
| 2020/0245553 A1 | 8/2020 | Hoffman et al. |
| 2020/0292445 A1 | 9/2020 | Morimoto |
| 2020/0325742 A1 | 10/2020 | Astudillo et al. |
| 2021/0053011 A1 | 2/2021 | Sugiyama et al. |
| 2021/0062697 A1 | 3/2021 | Yokoyama et al. |
| 2021/0073692 A1 | 3/2021 | Saha et al. |
| 2021/0076006 A1 | 3/2021 | O'Neill et al. |
| 2021/0095380 A1 | 4/2021 | Borin et al. |
| 2021/0123211 A1 | 4/2021 | Miller et al. |
| 2021/0138399 A1 | 5/2021 | Yokoyama et al. |
| 2021/0197151 A1 | 7/2021 | Miller |
| 2021/0207772 A1 | 7/2021 | Norton et al. |
| 2021/0215925 A1 | 7/2021 | Kim et al. |
| 2021/0216852 A1 | 7/2021 | Reece et al. |
| 2021/0232163 A1 | 7/2021 | Miller |
| 2021/0232741 A1 | 7/2021 | Ogiso et al. |
| 2021/0362637 A1 | 11/2021 | Hanis et al. |
| 2021/0381920 A1 | 12/2021 | Jacobsz et al. |
| 2022/0001969 A1 | 1/2022 | Pugnetti |
| 2022/0010707 A1 | 1/2022 | Sharma et al. |
| 2022/0048606 A1 | 2/2022 | Singh |
| 2022/0081261 A1 | 3/2022 | Karbassi |
| 2022/0087099 A1 | 3/2022 | Hoffman et al. |
| 2022/0154427 A1 | 5/2022 | Misaki |
| 2022/0178114 A1 | 6/2022 | Takahama |
| 2022/0186470 A1 | 6/2022 | Chiba et al. |
| 2022/0213603 A1 | 7/2022 | Al Eid et al. |
| 2022/0221368 A1 | 7/2022 | Bergeron |
| 2022/0228345 A1 | 7/2022 | Case et al. |
| 2022/0282651 A1 | 9/2022 | Reynolds et al. |
| 2022/0290411 A1 | 9/2022 | Anahara et al. |
| 2022/0343229 A1 | 10/2022 | Gruber et al. |
| 2022/0401899 A1 | 12/2022 | Miller |
| 2022/0404272 A1 | 12/2022 | Kendall et al. |
| 2023/0015077 A1 | 1/2023 | Kim |
| 2023/0061824 A1 | 3/2023 | Ell |
| 2023/0078852 A1 | 3/2023 | Campbell et al. |
| 2023/0129513 A1 | 4/2023 | Miller |
| 2023/0259080 A1 | 8/2023 | Whikehart et al. |
| 2023/0259088 A1 | 8/2023 | Borup et al. |
| 2023/0332532 A1 | 10/2023 | Thobe |
| 2023/0333577 A1 | 10/2023 | Miller |
| 2023/0333578 A1 | 10/2023 | Miller |
| 2023/0341092 A1 | 10/2023 | Thobe |
| 2023/0347303 A1 | 11/2023 | Miller |
| 2023/0358023 A1 | 11/2023 | Jordan et al. |
| 2023/0366510 A1 | 11/2023 | Thobe |
| 2023/0383416 A1 | 11/2023 | Ell |
| 2023/0383417 A1 | 11/2023 | Ell |
| 2023/0383418 A1 | 11/2023 | Ell |
| 2023/0392536 A1 | 12/2023 | Thobe |
| 2023/0399817 A1 | 12/2023 | Jordan |
| 2023/0399818 A1 | 12/2023 | Jordan |
| 2023/0407488 A1 | 12/2023 | Ell |
| 2023/0415106 A1 | 12/2023 | Miller |
| 2024/0060189 A1 | 2/2024 | Ell |
| 2024/0141506 A1 | 5/2024 | Ell |

FOREIGN PATENT DOCUMENTS

| | | |
|---|---|---|
| CA | 2447358 | 4/2005 |
| CA | 2702151 | 10/2007 |
| CA | 2637421 | 1/2010 |
| CA | 2642295 | 1/2010 |
| CA | 2736733 | 10/2011 |
| CA | 2958443 | 4/2017 |
| CA | 2995532 | 4/2017 |
| CA | 2916141 | 6/2017 |
| CN | 2092562 | 1/1992 |
| CN | 200958686 | 10/2007 |
| CN | 100348970 | 11/2007 |
| CN | 102997052 | 3/2013 |
| CN | 103106764 | 5/2013 |
| CN | 103497804 | 1/2014 |
| CN | 102997061 | 5/2015 |
| CN | 204824775 | 12/2015 |
| CN | 205640252 | 10/2016 |
| CN | 106764463 | 1/2019 |
| CN | 110513604 | 11/2019 |
| CN | 210176958 | 3/2020 |
| CN | 111537157 | 8/2020 |
| CN | 114001278 | 2/2022 |
| CN | 114877263 | 4/2023 |
| EP | 2602609 | 6/2013 |
| EP | 3076461 | 10/2016 |
| EP | 3101411 | 12/2016 |
| EP | 3112011 | 1/2017 |
| EP | 2994626 | 1/2018 |
| EP | 3285759 | 2/2018 |
| ES | 2398302 | 3/2013 |
| FR | 2388762 | 11/1978 |
| FR | 2689241 | 10/1993 |
| GB | 1179978 | 2/1970 |
| GB | 2097687 | 11/1982 |
| GB | 2545207 | 6/2017 |
| GB | 2559149 | 4/2022 |
| IN | 202141001384 | 1/2021 |
| IT | 201900008235 | 12/2020 |
| JP | 2004125039 | 4/2004 |
| JP | 2007204023 | 8/2007 |
| JP | 2008097832 | 4/2008 |
| JP | 2012002159 | 11/2014 |
| JP | 2016078893 | 5/2016 |
| KR | 20110010316 | 2/2011 |
| KR | 20130038986 | 4/2013 |
| KR | 102129951 | 7/2020 |
| KR | 102169280 | 10/2020 |
| KR | 102281640 | 7/2021 |
| RU | 2760879 | 12/2021 |
| WO | 1996006685 | 5/1996 |
| WO | 1997006004 | 2/1997 |
| WO | 1997006298 | 2/1997 |
| WO | 1998003711 | 1/1998 |
| WO | 2000063108 | 10/2000 |
| WO | 2002030551 | 4/2002 |
| WO | 2003003002 | 1/2003 |
| WO | 2003066423 | 8/2003 |
| WO | 2004003293 | 1/2004 |
| WO | 2004092307 | 10/2004 |
| WO | 2005018300 | 3/2005 |
| WO | 2007107652 | 9/2007 |
| WO | 2007112335 | 10/2007 |
| WO | 2007149851 | 12/2007 |
| WO | 2009013544 | 1/2009 |
| WO | 2009055024 | 4/2009 |

(56) References Cited

FOREIGN PATENT DOCUMENTS

| | | |
|---|---|---|
| WO | 2010042704 | 4/2010 |
| WO | 2010103260 | 9/2010 |
| WO | 2013112274 | 8/2013 |
| WO | 2014089443 | 6/2014 |
| WO | 2014173672 | 10/2014 |
| WO | 2015061868 | 5/2015 |
| WO | 2015153607 | 10/2015 |
| WO | 2016004107 | 1/2016 |
| WO | 2016026043 | 2/2016 |
| WO | 2016146404 | 9/2016 |
| WO | 2017074985 | 5/2017 |
| WO | 2017083778 | 5/2017 |
| WO | 2017087731 | 5/2017 |
| WO | 2017152269 | 9/2017 |
| WO | 2018005141 | 1/2018 |
| WO | 2018102378 | 6/2018 |
| WO | 2020044026 | 3/2020 |
| WO | 2020118020 | 6/2020 |
| WO | 2020132632 | 6/2020 |
| WO | 2020223803 | 11/2020 |
| WO | 2020237112 | 11/2020 |
| WO | 2021062563 | 4/2021 |
| WO | 2021100054 | 5/2021 |
| WO | 2022043197 | 3/2022 |
| WO | 2022126092 | 6/2022 |
| WO | 2022149501 | 7/2022 |
| WO | 2023287276 | 1/2023 |
| WO | 2023038579 | 3/2023 |
| WO | 2023137304 | 7/2023 |
| WO | 2023164683 | 8/2023 |
| ZA | 9606765 | 2/1998 |
| ZA | 200610366 | 1/2008 |

OTHER PUBLICATIONS

Membrane Technology and Research, Inc., Gasoline Vapor Recovery, 2018.
Jordan Technologies, Aereon, Recovering More Vapor = Increased Profits, 2015.
EPFL, Capturing CO2 from trucks and reducing their emissions by 90%, Dec. 23, 2019.
Sharma, Shivom et al., Carbon Dioxide Capture from Internal Combustion Engine Exhaust Using Temperature Swing Adsorption, Front. Energy Res., Sec. Carbon Capture, Utilization and Storage, Dec. 16, 2019.
Information Disclosure Declaration by Kyle E. Miller, Dec. 18, 2020.
Cott Manufacturing Company, FinkLet®/FinkPlate® Cathodic Proection Test Stations, Wayback Machine, May 22, 2000.
Alexandrakis et al., "Marine Transportation for Carbon Capture and Sequestration (CCS)", Department of Civil and Environmental Engineering, Thesis, Massachusetts Institute of Technology, Jun. 2010.
Datta et al., "Advancing carbon management through the global commoditization of CO2: the case for dual-use LNG-CO2 shipping", Carbon Management, 2020, vol. 11, No. 6, 611-630.
Ibitoye et al., "Poster Abstract: A Convolutional Neural Network Based Solution for Pipeline Leak Detection", School of Information Technology, Carleton University, Ottawa, Canada, Nov. 2019.
IntelliView, "Thermal Imaging Provides Early Leak Detection in Oil and Gas Pipelines", Petro Industry News, www.Petro-Online.com, Aug./Sep. 2018.
Southwest Research Institute, "Methane Leak Detection", 2021.
Masterduct, "Case Studies: High temp marine grade ship engine exhaust fume hose", retrieved at https://www.masterduct.com/CaseStudies/Hightempshipengineexhaustfumehose.aspx.
ACTI, "Advanced Maritime Emissions Control System (AMECS)", retrieved at https://sustainableworldports.org/wp-content/uploads/presentation-on-AMECS.pdf.
Neutrik XXR-2 XX Series, https://www.parts-express.com/Neutrik-XXR-2-XX-Series-Color-Coding_Ring-Red, 2022.
Hou, Qingmin, An FBG Strain Sensor-Based NPW Method for Natural Gas Pipeline Leakage Detection, Hindawi, Mathematical Problems in Engineering, vol. 2021, Article ID 5548503, pp. 1-8.
Lloyd's Register, Using technology to trace the carbon intensity of sustainable marine fuels, Feb. 15, 2023.
BORIN Manufacturing, Inc., DART for Test Station, Above Ground Remote Monitoring, Feb. 11, 2021.
BORIN Manufacturing, Inc., COMMANCHE Remote Monitoring and Control System, Mar. 24, 2017
BORIN Manufacturing, Inc., DART for Rectifiers, Remote Monitoring and Control System. Nov. 1, 2017.
BORIN Manufacturing, Inc., STELTH 2 Solid-State Reference Electrode for Buried and Concrete Service, Aug. 7, 2015.
BORIN Manufacturing, Inc., STELTH 3, Nov. 10, 2016.
BORIN Manufacturing, Inc., STELTH Reference Electrodes, Feb. 4, 2016.
BORIN Manufacturing, Inc., STELTH Solid-State Reference Electrodes, Nov. 8, 2016.
BORIN Manufacturing, Inc., STELTH Reference Electrodes, Oct. 10, 2017.
BORIN Manufacturing, Inc., 'Miracle half-cell', Palladium: BORIN's new reference electrode chemistry, Aug. 13, 2014.
BORIN Manufacturing, Inc., STREET DART, For Test Station, Ground Level Remote Monitoring, Mar. 2017.

* cited by examiner

ASSEMBLIES AND METHODS FOR MONITORING CATHODIC PROTECTION OF STRUCTURES

PRIORITY CLAIM

This is a continuation of U.S. Non-Provisional application Ser. No. 17/886,178, filed Aug. 11, 2022, titled "ASSEMBLIES AND METHODS FOR MONITORING CATHODIC PROTECTION OF STRUCTURES," which is a divisional of U.S. Non-Provisional application Ser. No. 17/805,801, filed Jun. 7, 2022, titled "ASSEMBLIES AND METHODS FOR MONITORING CATHODIC PROTECTION OF STRUCTURES," now U.S. Pat. No. 11,447,877, issued Sep. 20, 2022, which claims priority to and the benefit of U.S. Provisional Application No. 63/365,102, filed May 20, 2022, titled "ASSEMBLIES AND METHODS FOR MONITORING CATHODIC PROTECTION OF STRUCTURES," and U.S. Provisional Application No. 63/260,622, filed Aug. 26, 2021, titled "MINIATURE IR ERROR-FREE CATHODIC PROTECTION COUPON ASSEMBLY INSTALLED VIA PROBE," the disclosures of which are incorporated herein by reference.

TECHNICAL FIELD

The present disclosure relates to assemblies and methods for monitoring cathodic protection of underground or submerged structures and, more particularly, to assemblies and methods including a cathodic protection coupon monitoring assembly for monitoring the cathodic protection of underground or submerged structures.

BACKGROUND

Cathodic protection of metallic structures covered in an electrolyte associated with soil or a fluid is an established technique for reducing the rate of corrosion of the structure. Such cathodic protection may be facilitated by a cathodic protection system, which may use an electrical energy source to provide a cathodic current distributed over the surface of the structure, which may take the form of sacrificial anodes AC-to-DC rectifiers, and/or direct DC sources (e.g., batteries, solar panels, etc.). Once the cathodic protection system has been implemented, the effectiveness of the protection resulting from operation of the cathodic protection system may be assessed by measuring the potential difference between the structure and a reference electrode associated with an assembly used to assess the effectiveness.

An assembly used to assess the effectiveness of the cathodic protection system may simulate the conditions of uncoated bare metal of a known surface area on a structure that might normally result from a coating defect. In such a simulation, a metallic coupon may be used to measure a potential difference between the metallic coupon and the surrounding soil or fluid, and may be compared to cathodic protection criteria for the structure's material to determine whether an active corrosion process is occurring. Accurately measuring the true electric potential difference of the structure, however, has often been difficult, for example, due to errors or offsets resulting from nearby current sources, which may include otherwise uninterruptible sources, such as sacrificial anodes directly bonded to the protected structure, foreign rectifiers, stray currents, etc. For example, for situations in which several rectifiers protect the structure, it may be necessary for all the rectifiers to be interrupted simultaneously in order to obtain meaningful measurements that are not effected by current associated with the rectifiers. In addition, the time window with which to measure the potential difference may be relatively brief because, for example, the amount of time between current interruption and depolarization (i.e., the effects of the current as the structure de-energizes and discharges its electric charge) may vary from several seconds to just a fraction of a second, depending on the characteristics of the structure protected by the cathodic protection system and/or the surrounding environment. Furthermore, capacitive spikes that may occur shortly after current is interrupted may also mask the true potential difference intended to be measured.

In an effort to address these challenges, a reference electrode may be incorporated adjacent the metallic coupon in the cathodic protection system. The reference electrode may allow a technician to obtain error-free structure-to-electrolyte (or potential difference) measurements without a need to interrupt or disrupt nearby current sources. The potential difference may thus be measured reliably without needing to disrupt the current associated with operation of the cathodic protection system to facilitate measurement of the potential difference and/or without knowing the exact soil or fluid conditions and resistance in the vicinity of the measurements.

Existing assemblies used for monitoring the protection of underground or submerged structures, due to the size of the assemblies, may often require installation in the ground via mechanical excavation, hydro excavation, and/or hand digging. These processes may be costly, labor-intensive, unduly time consuming, and may risk damaging the structure. Additionally, these assemblies may often be fragile or easily damaged due to the materials used to construct some of the components. Further, many standard assemblies may utilize a liquid electrolyte for operation. Such electrolytes, due to their fluid nature, may be relatively easily added to the assembly, but may be susceptible to leakage, unless the assembly includes effective sealing at component interfaces, which may be complex and susceptible to degradation, which, in turn, may result in premature failure, thereby reducing the service life of the assembly once it has been buried in soil or submerged.

Accordingly, Applicant has recognized that there may be a desire to provide improved assemblies and methods for measuring the effectiveness of a cathodically protected structure through error-free potential measuring methods that improve the accuracy and/or reliability of the assembly while being relatively easier to install and/or maintain. The present disclosure may address one or more of the above-referenced considerations, as well as possibly others.

SUMMARY

As referenced above, it may be desirable to provide improved assemblies and methods for evaluating the error-free potential of a cathodically protected structure that is at least partially buried or submerged that may be more practicable, more efficient, less time consuming, and/or less labor-intensive to use. For example, there may be a desire to accurately measure the potential difference without interrupting an existing protective current or other current sources using a relatively more durable construction for the assembly. Furthermore, the assembly may be more easily installed by an individual technician. In some embodiments, the assemblies and methods may provide one or more of these capabilities for a variety of at least partially buried or submerged structures such as, for example, pipelines, storage tanks, offshore platforms, well casings, etc.

In some embodiments, a cathodic protection monitoring assembly to enhance monitoring of a cathodic protection system of a structure at least partially underground or submerged may define a longitudinal axis and include a first fitting. The first fitting may include an outer surface having an outer surface dimension sized to be greater than or equal to an outer rod surface dimension of a probe rod having a size and shape to facilitate placement of a portion of the cathodic protection monitoring assembly adjacent the structure. The first fitting further may include an inner surface having an inner surface dimension sized to be less than an inner surface dimension of a rod cavity of an end of the probe rod. The first fitting also may include an opening extending through the first fitting along the longitudinal axis. The cathodic protection monitoring assembly further may include an electrically conductive test coupon seated adjacent the first fitting. The electrically conductive test coupon may define a hollow interior. The cathodic protection monitoring assembly also may include an electrically conductive connector at least partially received in the hollow interior of the electrically conductive test coupon, and a wire bundle including a first wire and a second wire extending along the longitudinal axis through the hollow interior of the electrically conductive test coupon and the first fitting. The cathodic protection monitoring assembly further may include a plug disposed adjacent the electrically conductive test coupon. The plug may include a porous material and have a plug cavity. The cathodic protection monitoring assembly also may include a reference electrode connected to a distal end of the second wire. The second wire may facilitate an electrical measurement of the reference electrode. The cathodic protection monitoring assembly further may include a second fitting including a proximal end sized to fit at least partially within the plug cavity of the plug and a distal end including a fitting chamber configured to be at least partially filled with electrolyte, such that the reference electrode is at least partially covered with the electrolyte.

In some embodiments, a cathodic protection monitoring assembly to enhance monitoring of a cathodic protection system of a structure at least partially underground or submerged, may define a longitudinal axis and include a probe rod, including an elongated rod member extending between a first rod end provided with a grasping portion and a second rod end at least partially defining a rod cavity. The second rod end may include an outer rod surface having outer rod surface dimension. The cathodic protection monitoring assembly further may include a first fitting adjacent the second rod end and including an outer surface having an outer surface dimension greater than or equal to the outer rod surface dimension of the probe rod. The first fitting further may include an inner surface having an inner surface dimension less than an inner surface dimension of the rod cavity of the second rod end, and an opening extending through the first fitting along the longitudinal axis. The first fitting may be sized and dimensioned to be connected to the rod cavity. The cathodic protection monitoring assembly also may include an electrically conductive test coupon seated adjacent the first fitting. The electrically conductive test coupon may define a hollow interior. The cathodic protection monitoring assembly further may include an electrically conductive connector at least partially received in the hollow interior of the electrically conductive test coupon, and a wire bundle including a first wire and a second wire extending along the longitudinal axis through the hollow interior of the electrically conductive test coupon, the first fitting, and the probe rod. The cathodic protection monitoring assembly also may include a plug disposed adjacent the electrically conductive coupon. The plug may include a porous material and having a plug cavity. The cathodic protection monitoring assembly further may include a reference electrode connected to a distal end of the second wire. The second wire may facilitate an electrical measurement of the reference electrode. The cathodic protection monitoring assembly also may include a second fitting including a proximal end sized to fit at least partially within the plug cavity of the plug and a distal end including a fitting chamber configured to be at least partially filled with electrolyte, such that the reference electrode is at least partially covered with the electrolyte.

In some embodiments, a cathodic protection monitoring assembly to enhance monitoring of a cathodic protection system of a structure at least partially underground or submerged may include a probe rod and a first fitting. The probe rod may have an elongated rod member extending between a proximal rod end and a distal rod end at least partially defining a rod cavity sized to connect with the first fitting. The cathodic protection monitoring assembly also may include an electrically conductive test coupon seated adjacent the first fitting with a hollow interior extending therethrough and in communication with a hollow interior of the first fitting. The cathodic protection monitoring assembly further may include an electrically conductive connector at least partially positioned within the hollow interior of the electrically conductive test coupon, and a plug having a plug cavity adjacent to the electrically conductive test coupon. The cathodic protection monitoring assembly additionally may include a reference electrode connected to a distal end of one or more wires extending through the hollow interior of the electrically conductive test coupon and the first fitting. The cathodic protection monitoring assembly may also include a second fitting with a proximal end sized to fit at least partially within the plug cavity of the plug and a distal end including a fitting chamber. The fitting chamber may be configured to be at least partially filled with electrolyte, such that the reference electrode may be at least partially covered with the electrolyte.

In some embodiments, a cathodic protection monitoring assembly to enhance monitoring of a cathodic protection system of a structure at least partially underground or submerged may include a probe rod and a first fitting. The probe rod may have an elongated rod member extending between a proximal rod end and a distal rod end at least partially defining a rod cavity sized to connect with the first fitting. The cathodic protection monitoring assembly also may include an electrically conductive test coupon seated adjacent the first fitting with a hollow interior extending therethrough and in communication with a hollow interior of the first fitting. The cathodic protection monitoring assembly further may include an electrically conductive connector at least partially positioned within the hollow interior of the electrically conductive test coupon, and a plug having a plug cavity adjacent to the electrically conductive test coupon. The cathodic protection monitoring assembly may also include a second fitting with a proximal end sized to fit at least partially within the plug cavity of the plug and a distal end including a fitting chamber. The fitting chamber may be configured to be at least partially filled with electrolyte.

In some embodiments, a method for installing a cathodic protection coupon monitoring assembly to monitor cathodic protection of an at least partially buried structure or an at least partially submerged structure, may include passing lead wires from a coupon assembly through a probe rod. The coupon assembly may include an electrically conductive test coupon and a reference electrode, and the probe rod may include an elongated rod member extending between a first rod end provided with a grasping portion and a second rod end at least partially defining a rod cavity. The method further may include engaging the coupon assembly with the rod cavity at the second rod end of the probe rod, and tensioning the lead wires to stabilize the coupon assembly at the second rod end of the probe rod. The method also may include inserting the probe rod and the coupon assembly to one or more of a preselected depth or a preselected distance relative to the structure, and releasing tension on the lead wires. The method further may include withdrawing the probe rod from the preselected depth, leaving the coupon assembly at the one or more of the preselected depth or the preselected distance. The method also may include connecting the lead wires to an electrical junction in communication with a testing device configured to facilitate measurement of potential differences detected by the coupon assembly.

Still other aspects and advantages of these exemplary embodiments and other embodiments are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than can be necessary for a fundamental understanding of the embodiments discussed herein and the various ways in which they may be practiced. According to common practice, the various features of the drawings discussed below are not necessarily drawn to scale. Dimensions of various features and elements in the drawings may be expanded or reduced to more clearly illustrate embodiments of the disclosure.

DETAILED DESCRIPTION

The drawings include like numerals to indicate like parts throughout the several views. The following description is provided as an enabling teaching of exemplary embodiments, and those skilled in the relevant art will recognize that many changes may be made to the embodiments described. It also will be apparent that some of the desired benefits of the embodiments described may be obtained by selecting some of the features of the embodiments without utilizing other features. Accordingly, those skilled in the art will recognize that many modifications and adaptations to the embodiments described are possible and may even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, in particular, to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements. Similarly, the term "proximal" is understood to mean closer to, or in the direction of, a technician or operator. Accordingly, "distal" is understood to mean a location or direction distant to or directed away from the technician or operator.

Figure 1:
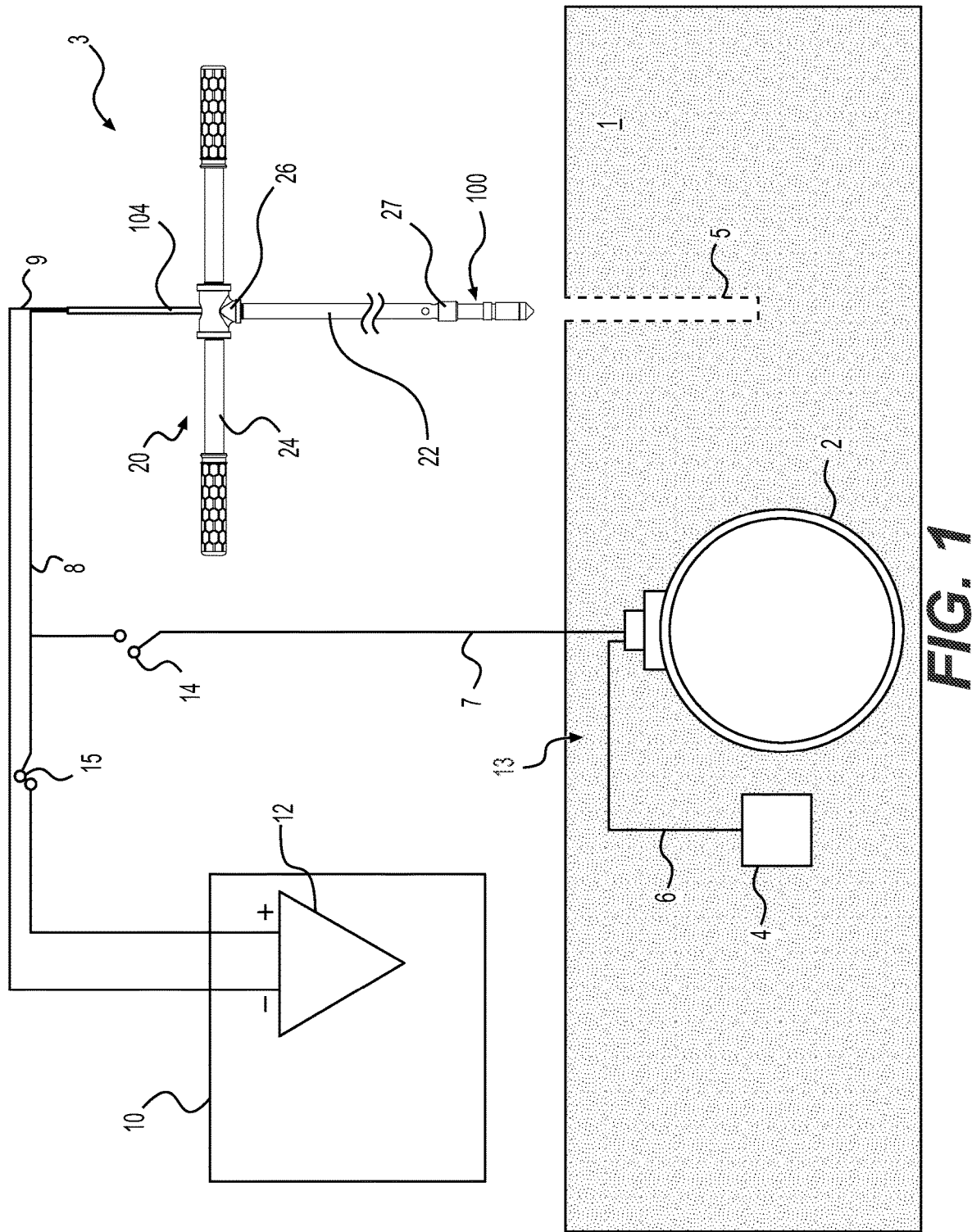
FIG. 1 is a schematic elevation view of an example cathodically protected structure, including an example cathode protection assembly and an example cathode protection monitoring assembly including an example probe rod and coupon assembly, according to embodiments of the disclosure.

FIG. 1 is a schematic view of example components of a cathodic protection monitoring assembly 3 or monitoring the effectiveness of a cathodic protection system 13, according to embodiments of the disclosure. As shown in FIG. 1, the cathodic protection monitoring assembly 3 may include an example probe rod 20 and coupon assembly 100. In some embodiments, the coupon assembly 100 may be an IR error-free coupon assembly. The example coupon assembly 100 may be configured to facilitate potential difference measurements for a structure 2 that is subject to cathodic protection by the cathodic protection system 13 and is at least partially buried in the ground 1 or submerged in a fluid. The cathodic protection system 13 may provide cathodic protection, for example, using a sacrificial anode 4 electrically connected to the structure 2 by a conductor 6, such as a cable. In some embodiments, the cathodic protection monitoring assembly 3 may be configured to provide potential difference measurements that are "instant off" in nature and/or substantially free of voltage drop error. In some embodiments, the probe rod 20 may be used in soil applications and may include an elongate rod member 22 extending between a proximal or first rod end 26 and a distal or second rod end 27. A transverse handle or grasping portion 24 may be located at or near the first rod end 26 to provide a technician using the probe rod 20 with enhanced leverage and/or torque for driving the probe rod 20 into the ground 1. In some embodiments, the grasping portion 24 may include a T-handle, for example, as shown in FIG. 1. The elongate rod member 22 may at least partially define an inner cavity 30 (see, e.g., FIG. 3 and FIG. 5) passing therethrough. The cavity can be circular, square, hexagonal, or other shape as appropriate for the application.

The probe rod 20 may be used to stabilize and insert the coupon assembly 100 into a pilot hole 5 excavated in the ground 1 adjacent to the structure 2. The coupon assembly 100 may be configured to engage the second rod end 27 of the elongate rod member 22 during assembly of the coupon assembly 100 with the probe rod 20 for installation of the coupon assembly 100 in the ground 1. For example, the elongate rod member 22 may be a cylindrical or tubular structure defining the inner cavity 30, which may be a bore or cavity through which the wire bundle 104 may pass from the coupon assembly 100 through the second rod end 27 to and through the first rod end 26. In some embodiments, the second rod end 27 of the elongate rod member 22 may serve to stabilize the coupon assembly 100, for example, when the coupon assembly 100 is introduced into the ground 1 at a testing site location. The wire bundle 104 may contain electrical conductor cables 8 and 9 electrically connecting to a voltage measuring device 12, for example, at a test station 10, as shown in FIG. 1. In some examples, the voltage measuring device 12 may include one or more switching devices for electrically connecting and/or disconnecting portions of the coupon assembly 100 to the voltage measuring device 12 (e.g., at the test station 10). The switches can allow portions of the coupon assembly 100 to be energized or isolated independent of the test station 10 and/or the structure 2. For example, one or more actuating switches (e.g., switches 14 and 15 shown in FIG. 1) may allow at least a portion of the coupon assembly 100 to be polarized relative to a voltage associated with the structure 2 through an electrical conductor 7 without electrically disconnecting the anode 4 of the cathodic protection system 13. For example, the coupon assembly 100 may be isolated from the structure 2 and/or test station 10 to be measured independently relative to a separate calibration electrode.

The coupon assembly 100, in at least some embodiments, may be used for a variety of structures set up in a variety of different environments. For example, on land the cathodically protected structure 2 may be a transmission pipeline or storage tank that is at least partially buried in the surrounding environment (e.g., soil 1). In other examples, the structure 2 may be an offshore pipeline or production rig asset that is at least partially submerged in an aqueous or other fluidic environment. One of skill in the art will appreciate that the design of a coupon assembly 100 may be at least partially influenced by characteristics associated with the intended surrounding environment, which are not meant to be limiting. Although most often referred to herein in the context of a structure 2 buried in soil 1, as shown in FIG. 1, the disclosed examples and methods may be used for any environment containing a structure subject to cathodic protection.

When buried in soil, for example, the protected structure 2 may represent a low-resistance path for stray electric currents, which tend to enter a structure at a discrete point and leave at another discrete point. Stray currents flowing in the vicinity of the structure 2 and/or the coupon assembly 100 itself may provide sources of voltage drop error, which may be proportional to magnitude of the current and/or resistivity of the soil 1. The soil 1 may often include a number of sources of undesirable stray current, such as, for example, foreign cathodic protection installations, transit systems, foreign rectifiers, welding operations, electrical power transmission systems, etc. An ability to conduct "instant-off" potential measurements at the test station 10 using the coupon assembly 100 without needing to interrupt such current sources (and their associated electric potential) may be a beneficial attribute of at least some embodiments of coupon assemblies disclosed herein.

Figure 2:
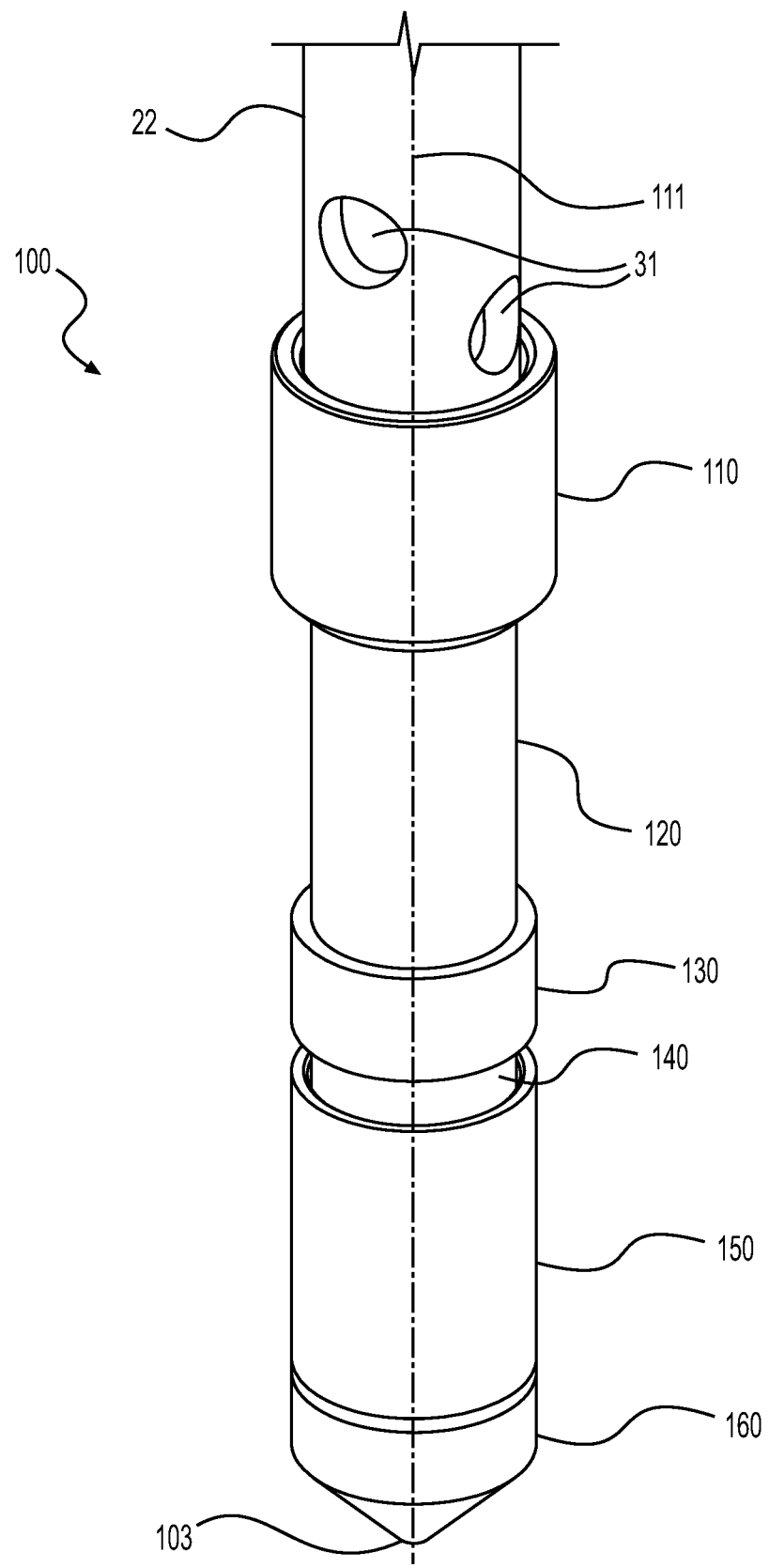
FIG. 2 is a schematic partial perspective view of a portion of an example coupon assembly, according to embodiments of the disclosure.
Figure 3:
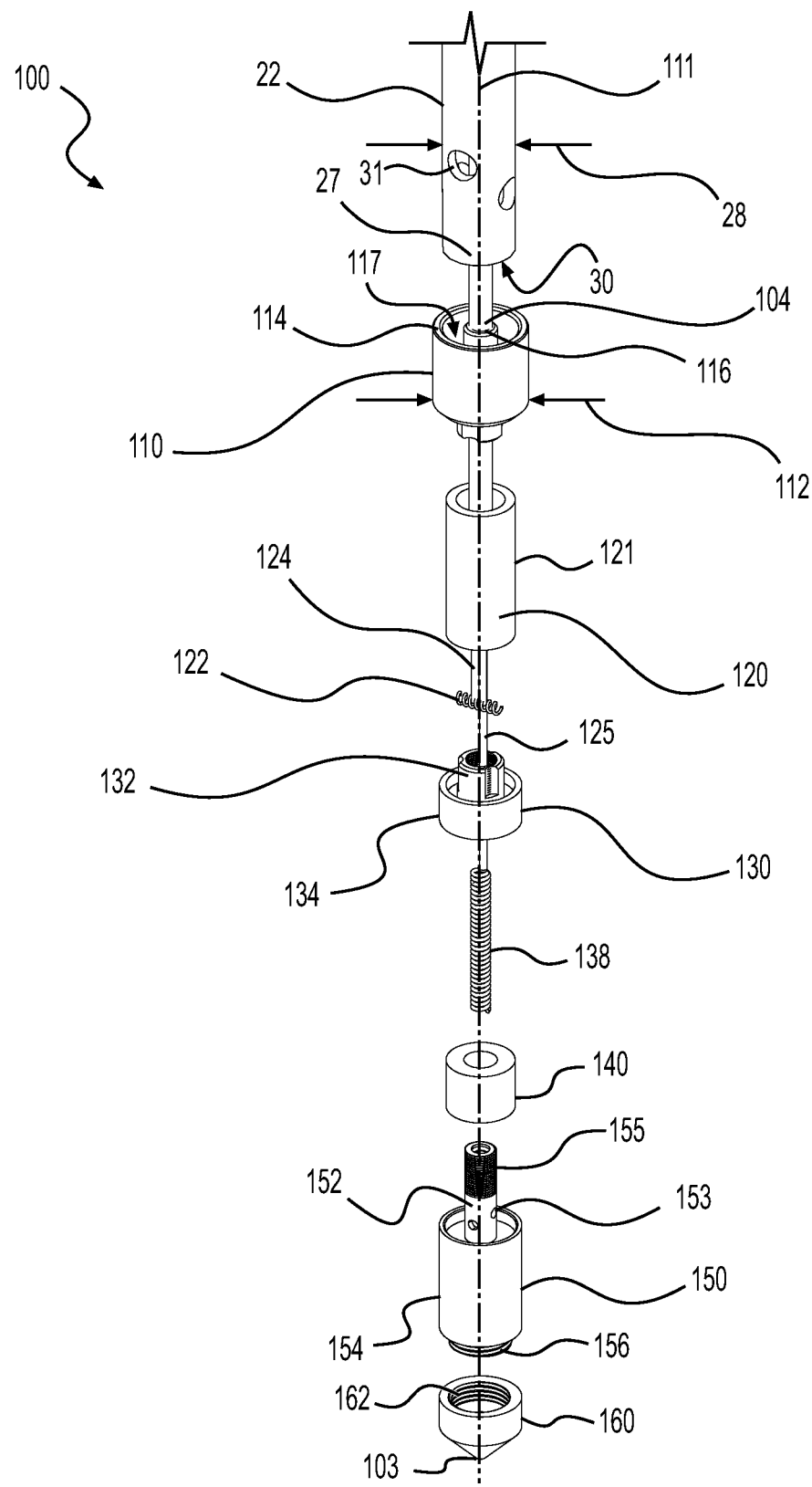
FIG. 3 is a schematic exploded view showing example components of the example coupon assembly shown in FIG. 2, according to embodiments of the disclosure.

FIG. 2 and FIG. 3 illustrate perspective and exploded views, respectively, of an example coupon assembly 100 (e.g., an IR error-free cathodic protection coupon assembly) for monitoring and accurate assessment of cathodic protection systems, such as the cathodic protection system 13 (for example, structure 2, anode 4, and conductor 6 shown in FIG. 1). The coupon assembly 100 may include a series of components that may be substantially concentric with or axisymmetric about a longitudinal axis 111 of the coupon assembly 100. All or nearly all the components may have a hollow central channel or bore through which lead wires 124 and 125 of the wire bundle 104 (FIG. 3) may pass, for example, through the coupon assembly 100 and the elongate rod member 22 or shaft of the probe rod 20. The wire bundle 104 may be of sufficient length to allow it to exit the first rod end 26 of the probe rod 20 and connect with a voltage measuring device and/or test station for measuring potential difference, for example, the voltage measuring device 12 and/or test station 10 shown in FIG. 1.

In some examples, the coupon assembly 100 may include a first fitting 110, which in the embodiment shown, also may serve as an interface for stabilizing the coupon assembly 100 in the distal or second rod end 27 of the elongate rod member 22 of the probe rod 20. For example, the wire bundle 104 may include an insulated cable and/or epoxy, tape, and/or a water-proof shrink wrap seal exiting the first fitting 110, for example, to prevent moisture ingress and/or provide strain relief for the wire bundle 104. Such construction may provide a seal and/or additional reinforcement, and, in some embodiments, may be added after other components of the coupon assembly 100 are assembled, for example, at a job site. The first fitting 110 may include an annular arrangement including an outer ring 114 and an inner channel 116 separating an internal plenum 117 from the outer ring 114. In some embodiments, the first fitting 110 may include an outer surface dimension 112 sized to be larger than an outer surface dimension 28 of the elongate rod member 22, for example, so that the second rod end 27 may fit within the plenum 117 when the inner channel 116 is sized to insert into the inner cavity 30 of the rod member 22. This example arrangement may facilitate longitudinal force transmission when the coupon assembly 100 is inserted into the ground 1 and pushed to a preselected or desired depth. The annular fit with the rod member 22 of the probe rod 20 also may allow a degree of lateral support to react against bending loads, which might otherwise prematurely damage the coupon assembly 100 or sever the wire bundle 104 during installation of the coupon assembly 100 into the ground 1.

In some examples, the elongate rod member 22 of the probe rod 20 may have holes 31 and/or other perforations along the longitudinal length, as shown in FIG. 2. The holes 31 may be used to stabilize the soil in and around the pilot hole 5 excavated by the probe rod 20 in the ground 1 adjacent the structure 2 (see FIG. 1) by directing water injected into the probe rod 20 to the surrounding environment. This water injection may ensure the entirety of the column of the pilot hole 5 is stabilized for the subsequent installation of the coupon assembly 100 into the pilot hole 5 to the preselected or desired depth.

The coupon assembly 100, in some embodiments, may include a test coupon 120. The test coupon 120 may be metallic and/or electrically conductive, and may be inserted into the bottom portion of the first fitting 110, for example, as shown in FIG. 3. The test coupon 120 may include a hollow cylinder including an outer surface 121 having a known or preselected surface area. In some embodiments, when mounting the test coupon 120 in the first fitting 110, complimentary surface features on the test coupon 120 and/or the first fitting 110 may be used for securing the test coupon 120 and the first fitting 110 to one another, for example, instead of fasteners, which may corrode. In some embodiments, the first fitting 110 may include an extension of the inner channel 116, which may be received in an inner cavity or hollow interior of the test coupon 120. In some embodiments, in addition to, or instead of, an extension of the inner channel 116, the first fitting 110 may define a recess for receiving at least a portion of the upper edge of the test coupon 120.

The test coupon 120, in some embodiments of the cathodic protection monitoring assembly 3, may be intended to simulate uncoated portions of the metallic structure 2 that is being protected by the cathodic protection system 13. In such embodiments, material forming the coupon 120 may be substantially matched to the uncoated base material of the structure. For example, for use with buried storage tanks or pipes, this base material may often include or be a mild steel or similar alloy. For example, the material may be a mild 1018 low-carbon steel having good case-hardening qualities that may be well-suited to cold forming and bending techniques. Similar materials, such as A36 steel are also contemplated, as well as a number of alternative materials, depending on, for example, the specific environment and/or characteristics of the structure 2 that is buried or submerged.

In some embodiments, an intermediate fitting 130 may be secured to an end of the test coupon 120 opposite the first fitting 110. The intermediate fitting 130 may be substantially annular and may define an inner channel portion 132 sized to fit within the interior of the test coupon 120 and include an outer flanged portion 134 sized to closely fit around the outer surface 121 of the test coupon 120 (see FIG. 3). For example, the space between the inner channel portion 132 and the outer flanged portion 134 of the intermediate fitting 130 may define a reception space or pocket that is flush with the inner and outer surfaces of the test coupon 120. The inner channel portion 132 of the intermediate fitting 130 may also at least partially define a central bore configured to allow the passage of one or more of the lead wires 124 and 125 therethrough.

The test coupon 120 may act as a polarized element, and the outer surface 121 may have a surface area sized for specific testing-related purposes. For example, the exposed outer surface area of the outer surface 121 of the test coupon 120 may be dimensioned to facilitate testing-related calculations of characteristics of interest, such as, for example, corrosion-related characteristics including corrosion rates. For example, the outer surface area of the outer surface 121 may be about ten square centimeters, which may be a convenient surface area size for such calculations. Other outer surface area sizes are contemplated, which may be used, for example, in environments where specific potentials or current densities are expected to be encountered. In some examples, other outer surface area sizes are contemplated, which may depend on the relative size or sizes of coating defects anticipated on the surface of the structure being cathodically protected. In some examples, a test coupon 120 may have an outer surface 121 with a surface area of about one square centimeter sized in accordance with expected coating defect sizes for a structure with a newer and/or higher quality coating. In some examples, a test coupon 120 may have an outer surface 121 with a surface area of about 100 square centimeters sized in accordance with expected coating defect sizes for a structure with a lesser quality coating or a situation where damage to the coating of the cathodic protection system 13 may be suspected.

In some embodiments, one or more additional test coupons 120 may be incorporated into the coupon assembly 100, and the one or more additional test coupons 120 may have different sizes, electrical conductivities, compositions, etc., for example, depending on the characteristics of the structure 2 and/or the surrounding environment. For example, one or more additional test coupons 120 may be used together, and each of the one or more additional test coupons 120 may have respective surface areas of about one square centimeter, ten square centimeters, and/or 100 square centimeters.

In some embodiments, a coupon assembly 100 may have, for example, three individual coupons having multiple surface areas. For example, a first coupon may have a surface area of about one square centimeter sized to measure AC voltage and/or current density. A second and a third coupon may have the same approximate surface area (sized in accordance with expected coating defect sizes for the structure) and may be used to measure DC voltage and/or current density. For example, the second coupon may have a surface area of about 10 square centimeters and may be connected to the structure 2 being cathodically protected to obtain IR error-free potential measurements. The third coupon may also have a surface area of about 10 square centimeters and be electrically isolated from the structure 2. The third coupon may then be used, for example, to obtain native or "depolarized" measurements without having to detach and depolarize the second coupon to obtain the same native measurements.

In some embodiments, the test coupon 120 and a first lead wire 124 (or a second lead wire 125) may be electrically connected in the interior of the test coupon 120 via a conductive connector 122. In some embodiments, the conductive connector 122 may include a conductive coil. In some examples, the first lead wire 124 and the second lead wire 125 may be bundled together, helically wrapped together, and/or insulated together.

In the environment surrounding the structure 2 under cathodic protection, current may flow, for example, through the soil (and/or other electrolyte), through the structure 2 itself, and/or through conductive cables or wires electrically connecting the structure to the test coupon 120 of the coupon assembly 100. In some embodiments, the lead wires may include one or more additional conductors, for example, such that effects of electrical interference from flowing currents on potential difference measurements may be reduced, minimized, or eliminated. For example, the first lead wires 124 may include two conductors attached to the conductive connector 122; one of the conductors may be electrically connected to the structure 2 under cathodic protection and may carry current, and another separately-insulated conductor may be electrically connected to a potential measuring device free from current load. In this example configuration, additional voltage drop error may thus be avoided by taking potential difference measurements from the conductor that is not electrically connected to the structure 2.

The first lead wire 124 may be electrically and/or physically secured to the conductive connector 122 to provide a strong electrical connection. In some embodiments, the first lead wire 124 may be wrapped tightly around the conductive connector 122, and in other embodiments, the first lead wire 124 may be directly connected to the conductive connector 122 via soldering (e.g., via lead solder) and/or a brazed connection. In some examples, the conductive connector 122 may be oriented transverse relative to the longitudinal axis 111 of the coupon assembly 100, for example, as shown in FIG. 3. In some embodiments, the conductive connector 122 may include windings of metallic wire or a strip of metallic material that may be longitudinally compressed to fit transversely in the inner cavity of the test coupon 120, for example, such that opposing ends of the conductive connector 122 are biased against opposing sides of the inner cavity of the test coupon 120. This example configuration may serve to secure the position of the conductive connector 122 inside the inner cavity of the test coupon 120 and maintain electrical contact with the inner cavity of the test coupon 120. In some embodiments, it may not be necessary for the second lead wire 125 to be electrically connected to the conductive connector 122. The second lead wire 125 may be physically but not electrically secured to the first lead wire 124 (and/or to one or more other wires) in the wire bundle 104 and may be threaded through the inner channel 116 of the first fitting 110 in a direction toward the conductive connector 122. In some embodiments, heat shrink tubing may be provided over some or all of the wire bundle 104 and/or any electrical connections, for example, to improve the electrical insulation and durability associated with the wire bundle 104.

With the electrical connections made (and any wire insulation and/or heat shrink tubing secured), the inner cavity of the test coupon 120 may be filled with a hardenable filler (e.g., epoxy, adhesive, and/or plaster) and allowed to cure or harden and fix the locations of the conductive connector 122 and related components in the inner cavity of the test coupon 120, which may also serve to provide strain relief and insulation for the electrical connections. The hardenable filler also may prevent the inner surface of the test coupon 120 from electrical connection with the soil to prevent corrosion on the inner surface. In some examples, the hardenable filler may also serve to secure physical connections between the test coupon 120 and the first fitting 110 and the intermediate fitting 130. In some embodiments, the hardenable filler may include a slow-cure epoxy (e.g., curable in a time period ranging from about thirty minutes to about twelve to twenty-four hours), including multi-part compounds of resin and hardener. Prior to filling the inner cavity of the test coupon 120, the hardenable filler may be subjected to low pressure or a vacuum, for example, to remove voids, air pockets, and/or moisture. The inner cavity of the test coupon 120 may thereafter be filled using, for example, a syringe or other similar material injection device, such that electrical and/or physical connections between the conductive connector 122 and one or more of the lead wires 124 or 125 may be substantially or completely encapsulated, and the hardenable filler may be allowed to set to a semi-solid or solid state.

The coupon assembly 100 may include a second fitting 150 connected to the intermediate fitting 130 and/or to the test coupon 120. For example, as shown in FIG. 3, the second fitting 150 may include a first or proximal end 152 at least partially defining a relatively smaller outer surface dimension (e.g., a diameter) than a second or distal end 154 of the second fitting 150. In some embodiments, the proximal end 152 of the second fitting 150 may include external threads 155 for cooperative threaded engagement with the inner channel portion 132 of the intermediate fitting 130. Alternatively, or in addition, the second fitting 150 and the intermediate fitting 130 may be secured to one another via, for example, a press fit, one or more set screws, and/or adhesives. The distal end 154 of the second fitting 150 may at least partially define an internal chamber or reservoir, which may be at least partially filled with an electrolyte material or solution. In some examples, the proximal end 152 of the second fitting 150 may include one or more holes 153 through a sidewall of the second fitting 150. The one or more holes 153 may allow the electrolyte solution of the coupon assembly 100 to be in electrical communication with the surrounding soil or fluid environment in which the structure 2 being protected is present. For example, as shown in FIG. 3, the proximal end 152 of the second fitting 150 may include external threads 155 for cooperatively engaging internal threads of the intermediate fitting 130, a plug 140, and/or other components of the coupon assembly 100.

In some embodiments, the distal end 154 of the second fitting 150 may be configured to be connected to a distal end cap 160 of the coupon assembly 100. A water-resistant or water-tight seal may be provided between the distal end 154 of the second fitting 150 and the distal end cap 160. The water-resistant or water-tight seal may be provided by sealant, caulk, adhesives, gaskets, and/or other sealing joint configurations. The distal end cap 160 may include a tip 103 having a conical, pointed, and/or tapered shape, which may increase the ease of installing the coupon assembly 100 into the ground, for example, by displacing material and/or debris as the coupon assembly 100 is inserted into the ground. In some embodiments, the distal end cap 160 may be attached to the second fitting 150 via, for example, a threaded connection, adhesives, and/or fasteners (e.g., one or more set screws). In the example shown in FIG. 3, the distal end cap 160 includes internal threads configured to engage complimentary external threads of the second fitting 150. The example threaded engagement between the distal end cap 160 and the second fitting 150 may facilitate selective separation and engagement between the distal end cap 160 and the second fitting 150, for example, such that the distal end cap 160 may be removed from the second fitting 150 for supplying electrolyte material to the distal end 154 of the second fitting 150 to substantially or completely fill the distal end 154 with the electrolyte material. In some embodiments, the distal end cap 160 may be formed integrally with (e.g., as a unitary component) the second fitting 150 and may not be easily separated from the second fitting 150.

In some embodiments, the electrolytic material may include a liquid electrolyte, a solid-state electrolyte, and/or an electrolyte having a gel-like form. For example, a liquid electrolyte may render it relatively easier to add electrolyte to the coupon assembly 100. In some embodiments, the coupon assembly 100 may include seal-like structures and/or may be assembled using sealant to seal adjacent components to reduce the likelihood or prevent electrolytic material having a liquid form from leaking from the coupon assembly 100. In some embodiments, a solid-state electrolyte (e.g., a plaster impregnated with copper sulfate ($CuSO_4$) or similar material) may be used when, for example, the coupon assembly 100 will be placed in an aqueous environment.

In some embodiments, at least a portion of the electrolytic material may have a gel-like form, which may reduce the likelihood or substantially prevent leakage of the electrolytic material from the coupon assembly 100, which, in turn, may render the coupon assembly 100 relatively more durable and/or may increase the service life of the coupon assembly 100, for example, as compared to a coupon assembly including solely liquid electrolyte. For example, at least a portion of the electrolytic material may include copper sulfate, water, a solid filler, mixtures thereof, and/or similar materials or materials having similar electrolytic and/or gel-like characteristics, although other electrolytic materials are contemplated. The gel-like electrolyte may include, for example, a liquid of distilled water supersaturated with copper sulfate pentahydrate, a solid powder or aggregate of hydrophilic fumed silica as a thickener and/or solidifying agent, and powdered copper sulfate pentahydrate to increase the concentration of copper sulfate and prolong the life of the electrolyte mixture. In some embodiments, the mixture may include approximately 1000 milliliters of distilled water supersaturated with copper sulfate (in a ratio having 2 milliliters of distilled water per gram of powdered copper sulfate pentahydrate), 120 grams of hydrophilic fumed silica, and 150 grams of powdered copper sulfate pentahydrate.

As shown in FIG. 3, in some embodiments, the coupon assembly 100 may include a reference electrode 138 electrically connected to the second lead wire 125 and suspended within the electrolytic material in a reservoir or chamber of the second fitting 150, for example, to facilitate potential difference measurements (e.g., instant-off potential difference measurements). For example, in some embodiments, the second lead wire 125 may at least partially form the reference electrode 138. As shown in FIG. 3, a portion of the second lead wire 125 may be helically wrapped around itself to form a coil, which may result in an increased surface area for electrical connectivity. In some embodiments, the reference electrode 138 may include an electrically conductive and/or metallic coil, an electrically conductive and/or metallic strip, and/or an electrically conductive and/or metallic rod, and may be connected in a fixed relationship with the test coupon 120, which may be electrically conductive as described herein. In some embodiments, a metallic strip or rod of copper and/or zinc may be bonded to the second lead wire 125 and situated in the electrolytic material in the second fitting 150. When combined with the electrolytic material, this example combination may facilitate measurement of potential differences between the test coupon 120 and reference electrode 138 with an allowable tolerance per NACE Standard TM0211-2011, or having voltage drop error limited to about ±10 millivolts (mV) or less.

In some embodiments, the plug 140 may be configured to at least partially encircle the proximal end 152 of the second fitting 150, for example, between the intermediate fitting 130 and the distal end 154 of the second fitting 150. The plug 140 may be formed from a hydrophilic material or hydrophobic material, and/or may have a defined porosity or a defined rate through which selected materials may flow through the plug 140. In some embodiments, the plug 140 may be configured to allow and/or wick moisture from the environment through capillary action to hydrate the electrolytic material, for example, via passage through one or more holes 153 in the proximal end 152 of the second fitting 150, while, in some embodiments, preventing the electrolytic material from escaping from the second fitting 150. The plug 140 may also allow the coupon assembly 100 to be positioned in various orientations without the risk of leakage of the electrolytic material from the second fitting (or with a relatively reduced risk of leakage). In some embodiments, at least a proximal portion of the distal end 154 of the second fitting 150 may include a chamfer, bevel, or recessed geometry, for example, to engage and/or locate the plug 140 with respect to the proximal end 152 of the second fitting 150 (e.g., about the proximal end 152) when the coupon assembly 100 is assembled. A distal end 154 of the second fitting 150 may have an inner chamber, plenum, or reservoir with a volume, which may contain an electrolytic material and reference electrode 138.

The plug 140 may be formed from, for example, ceramics, clay-related materials, and/or other porous materials. In some embodiments, hydrophilic polymeric materials, such as, for example, high or ultra-high molecular weight polyethylene, may form the plug 140. In some embodiments, at least some polymeric materials may be relatively more durable and/or relatively less brittle than the ceramics and/or clay-related materials, and may result in the plug 140 being relatively less likely to crack, chip, or be damaged when inserted into relatively course soils and/or environments including hazards, such as rocks or other buried materials. In some embodiments, the plug 140 may be formed from one or more materials having a defined porosity size corresponding to the average diameter of an individual pore in the material matrix. For example, the material of the plug 140 may have a porosity ranging from about 4 micrometers (μm) to about 20 μm, for example, from about 5 μm to about 15 μm. In some embodiments the material may have a porosity of approximately 10 μm, although other porosity ranges and/or pore size ranges may be contemplated, for example, depending on the specific characteristics of the soil or fluid in which the structure 2 is present.

In some embodiments, one or more of the components of the coupon assembly 100 may be formed via, for example, three-dimensional printing. In some such examples, one or more of the components may be formed from materials via three-dimensional printing. For example, the first fitting 110, the intermediate fitting 130, the second fitting 150, and/or the distal end cap 160 may be formed via three-dimensional printing. In some embodiments, filaments of, for example, acrylonitrile butadiene styrene (ABS), polyethylene terephthalate (PET), and/or nylon may be used to form one or more of the components using a fused deposition three-dimensional printing apparatus. In some embodiments, for example, UV-cured resins offering greater precision and density may be used to form one or more of the components using a stereolithographic three-dimensional printing apparatus. Such materials may be water-resistant, electrically insulating, and/or abrasion-resistant. Other manufacturing techniques and/or materials are contemplated, such as, for example, injection molding, blank molding, and/or post-molding machining processes.

Figure 4:
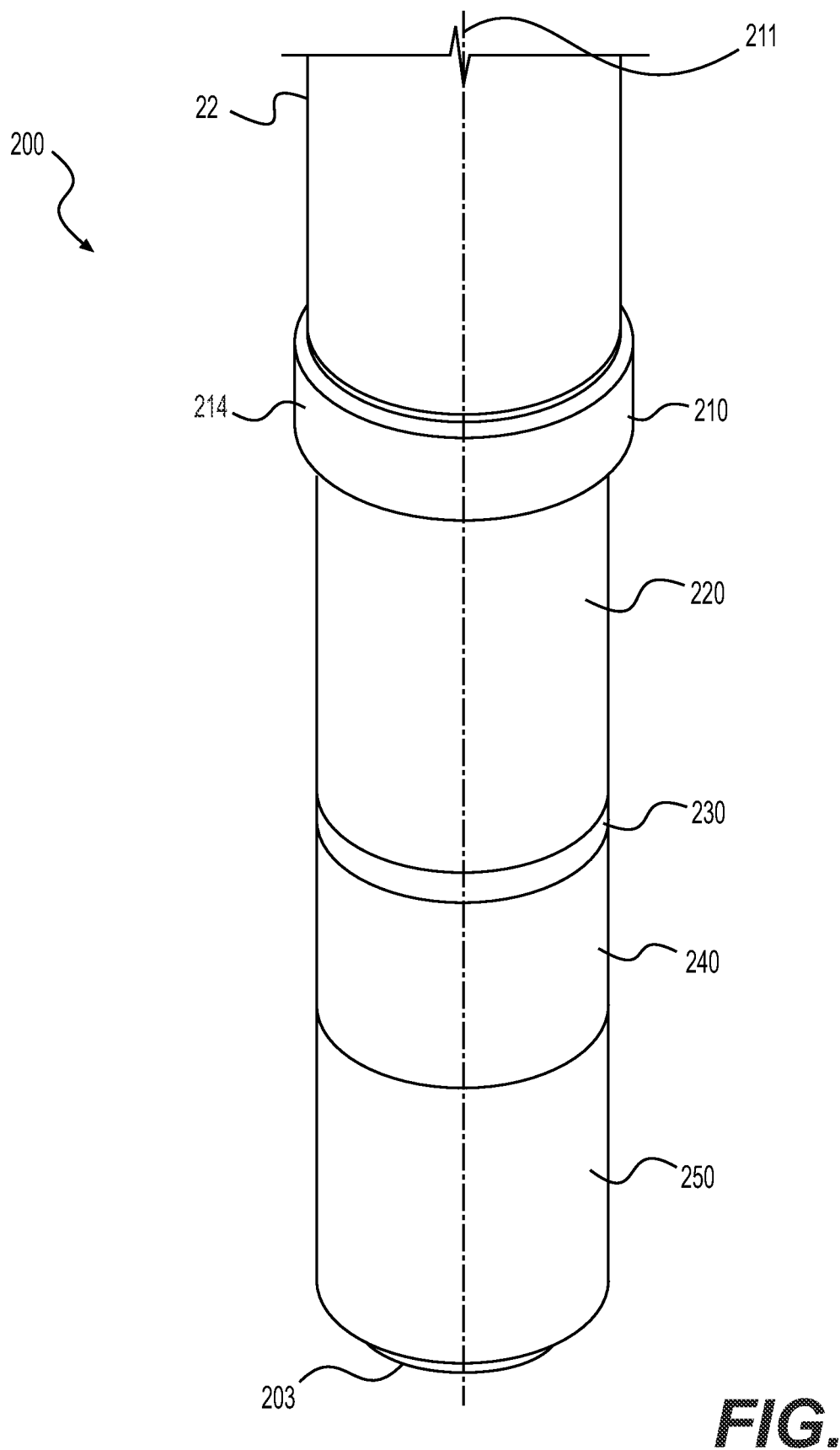
FIG. 4 is a schematic partial perspective view of another example coupon assembly, according to embodiments of the disclosure.
Figure 5:
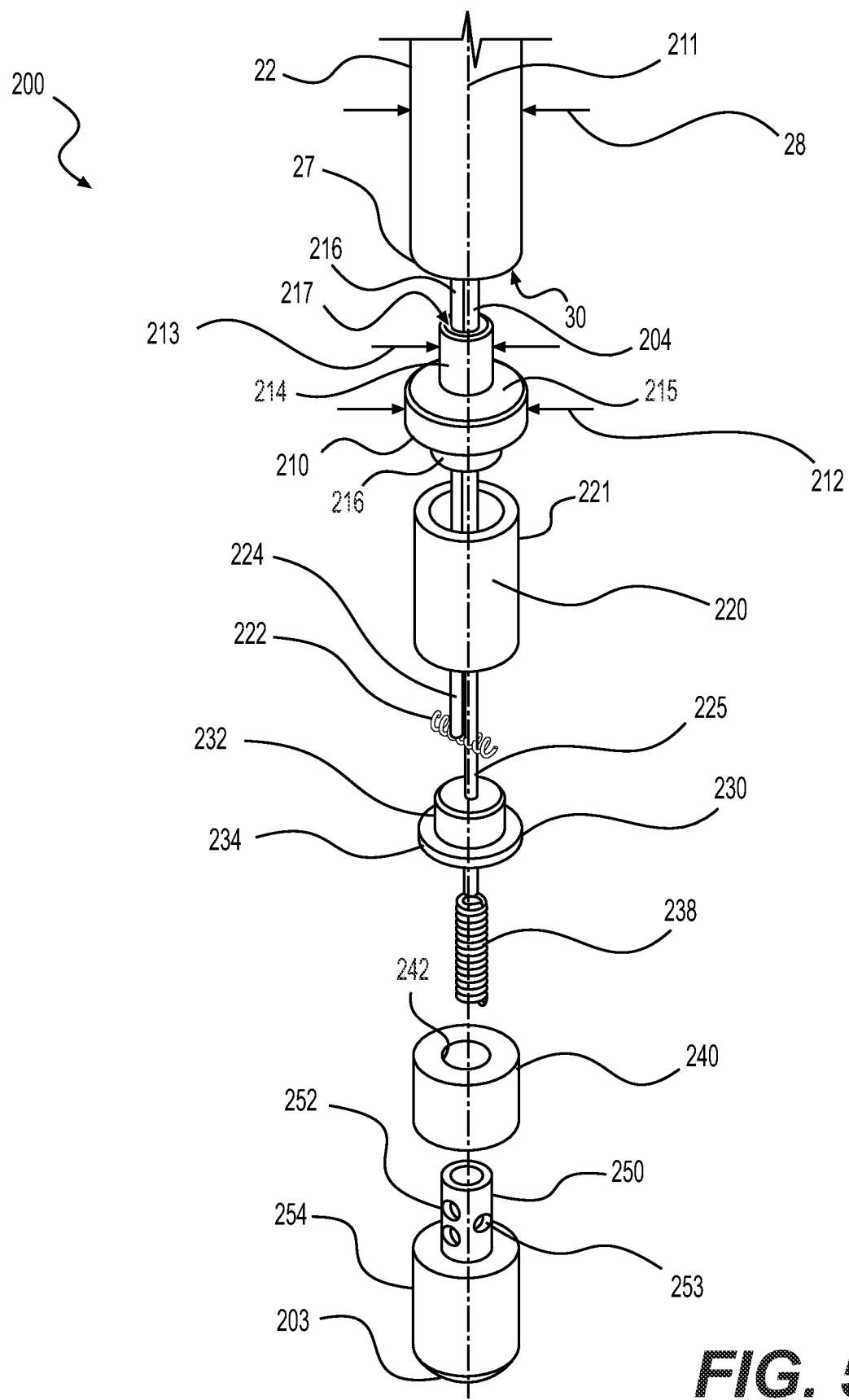
FIG. 5 is a schematic exploded view showing example components of the example coupon assembly shown in FIG. 4, according to embodiments of the disclosure.

FIG. 4 and FIG. 5 are schematic perspective and exploded views, respectively, of another embodiment of the coupon assembly 200 (e.g., an IR error-free cathodic protection coupon assembly) for assessment of cathodic protection systems, such as the example cathodic protection system 13 shown in FIG. 1. The example coupon assembly 200 shown in FIGS. 4 and 5 may be substantially cylindrical and may include components concentric with or axisymmetric about a longitudinal axis 211 of the coupon assembly 200. As shown in FIG. 5, many of the example components may have a hollow central bore through which first and second lead wires 224 and 225 of a wire bundle 204 may pass, including a shaft 22 of a probe rod 20. The wire bundle 204 may be used for the determining cell potential measurements at a remote test station, for example, as previously described herein with respect to FIGS. 1-3.

As shown in FIGS. 4 and 5, the example coupon assembly 200 may include a first fitting 210, which may connect the coupon assembly 200 to the distal or second rod end 27 of the elongate rod member 22 of the probe rod 20, and in some embodiments, may act to secure and/or stabilize the coupon assembly 200 in the distal or second rod end 27. The first fitting 210 may at least partially define reverse-hourglass-like geometry including upper section 214 and a lower section 216 of a relatively smaller transverse dimension 213 (e.g., relatively smaller diameters) than a transverse dimension 212 of a central region 215 (e.g., transverse relative to the axis 211). For example, the central region 215 may define a first outer surface dimension 212 sized to be larger than an outer surface dimension 28 of the elongate rod member 22. In some embodiments, the first outer surface dimension 212 may be only slightly greater than the outer surface dimension 28 of the elongate rod member 22 of the probe rod 20. In some embodiments, the first outer surface dimension 212 may range from about 0.250 inches to about 1.0 inch, such as, for example, from about 0.35 inches to about 0.750 inches, or for example, from about 0.375 inches to about 0.625 inches. In some embodiments, the first outer surface dimension 212 may range from about 0.40 inches to about 0.60 inches (e.g., about 0.50 inches). Other sizes are also contemplated.

The first fitting 210 may include an upper portion 214 that at least partially defines a second outer surface dimension 213 sized to at least partially fit or be received within the cavity 30 of the elongate rod member 22 of the probe rod 20, for example, such that the second rod end 27 seats against the larger central region 215 (FIG. 5). This example configuration may facilitate longitudinal transmission of downward force used, for example, when the coupon assembly 200 is inserted into in the ground 1 for placement of the coupon assembly 20 adjacent the structure 2 being cathodically protected. The upper portion 214 of the first fitting 210, which may be received in the cavity 30 of the second rod end 27, may resist bending loads that may be transmitted from the elongate rod member 22 as the coupon assembly 200 is inserted into the ground 1, which may stabilize connection between the coupon assembly 200 and the elongate rod member 22 and/or substantially maintain the orientation of the coupon assembly 200 relative to the probe rod 20 as the coupon assembly 200 is inserted into the ground.

Similar to examples shown in FIGS. 2 and 3, the test coupon 220 (e.g., a metallic, electrically conductive test coupon) may be connected to the lower section 216 of the first fitting 210. In some embodiments, the test coupon 220 may include a hollow cylinder at least partially defining an outer surface 221 having a preselected or desired surface area. The test coupon 220 may be at least partially formed from an electrically conductive material, such as, for example, mild 1018 low-carbon steel or an alloy at least similar to an uncoated base material at least partially forming the buried or submerged structure 2 being cathodically protected.

In some embodiments, an intermediate fitting 230 may be secured to an end of the test coupon 220 opposite the first fitting 210. The intermediate fitting 230 may include a proximal upper portion 232 sized to fit at least partially within an interior portion of the test coupon 220, and an outer flange portion 234 sized such that the outer surface 221 of a lower edge of the test coupon 220 is approximately flush with an outer surface of the outer flange portion 234.

As shown in FIG. 5, the first lead wire 224 may be electrically secured to a conductive connector 222, and the conductive connector 222 may be electrically contacted with an inner wall of the test coupon 220. For example, the first lead wire 224 may be electrically connected to the conductive connector 222 via soldering or brazing, providing both an electrical and physical connection. As shown in FIG. 5, the conductive connector 222 may be oriented transverse relative to the longitudinal axis 211 of the coupon assembly 200. In some embodiments, the conductive connector 222 may include a conductive coil. For example, in some embodiments, the conductive connector 222 may include windings of metallic wire or a strip of metallic material that may be longitudinally compressed to fit transversely in the inner cavity of the test coupon 220, for example, such that opposing ends of the conductive connector 222 are biased (i.e., spring loaded) against opposing sides of the inner cavity of the test coupon 220. This example configuration may serve to secure the position of the conductive connector 222 inside the inner cavity of the test coupon 220 and maintain electrical contact with the inner cavity of the test coupon 220. In some embodiments, it may not be necessary for the second lead wire 225 to be electrically connected to the conductive connector 222. The second lead wire 225 may be physically but not electrically secured to the first lead wire 224 (and/or to one or more other wires) in the wire bundle 204 and threaded through an inner channel 217 of the first fitting 210 in a direction toward the conductive connector 222. In some embodiments, heat shrink tubing may be provided over some or all of the wire bundle 204 and/or any electrical connections, for example, to improve electrical insulation associated with the wire bundle 204.

As shown in FIGS. 4 and 5, a plug 240 may be disposed adjacent the intermediate fitting 230. In some embodiments, the plug 240 may be formed from, for example, a porous material. The plug 240 may be substantially cylindrical, although other shapes are contemplated. In some embodiments, the plug 240 may be formed from polymeric composition having preselected and/or defined porosity. In some examples, the plug 240 may be formed ceramic and/or clay-related materials, which may be selected to provide limited passage of water or moisture from the surrounding environment therethrough. Porosity characteristics at least similar to those previously described herein may be selected, although other porosities are contemplated depending on, for example, the electrolyte/environment combination specific to the cathodic protection being assessed.

The example coupon assembly 200 may include a second fitting 250 connected to the plug 240. For example, as shown in FIG. 5, second fitting 250 may include a proximal end 252 at least partially defining one or more holes 253 configured to receive moisture through the plug 240 and into the second fitting 250. In some examples, the proximal end 252 of the second fitting 250 may be inserted into an interior passage 242 of the plug 240. In some embodiments, at least a portion of the proximal end 252 of the second fitting 250 may be secured to the plug 240 via, for example, adhesives and/or other known securing methods. In some examples, a threaded engagement or press-fit connection may be used to secure the proximal end 252 of the second fitting 250 to the plug 240. As shown in FIG. 5, the proximal end 252 may at least partially define a substantially cylindrical opening extending through at least a portion of the second fitting 250 to allow for the insertion and passage of a reference electrode 238 therethrough. A distal end 254 of the second fitting 250 may at least partially define a relatively larger outer dimension or diameter than the proximal end 252. The distal end 254 may at least partially define an inner volume reservoir or chamber configured to receive an electrolytic material.

The reference electrode 238 of the coupon assembly 200 may be electrically connected to the second lead wire 225 and suspended, encapsulated, or at least partially covered within the electrolytic material in the reservoir or chamber of the second fitting 250. The reference electrode 238 may be an electrically conductive coil, an electrically conductive strip, an electrically conductive bar, an electrically conductive ribbon, or another electrically conductive configuration to provide strong electrical contact with the surrounding electrolyte.

In some embodiments, the coupon assemblies 100 and/or 200 may be relatively compact in size, for example, ranging from about 2 inches long to about 20 inches long (measured axially), from about 4 inches in length to about 12 inches in length, from about 5 inches in length to about 10 inches in length, from about 5 inches in length to about 8 inches in length, from about 5 inches in length to about 7 inches in length (e.g., about 6 inches in length). In some embodiments, the coupon assembly 200 may range from about 0.25 inches in diameter or dimension to about 1.0 inch in diameter or dimension, from about 0.33 inches in diameter or dimension to about 0.75 inches in diameter or dimension, or from about 0.40 inches in diameter or dimension to about 0.66 inches in diameter or dimension (e.g., about 0.50 inches in diameter or dimension). In some embodiments, a relatively compact size may facilitate ease of assessing the cathodic protection of a cathodically protected structure 2 by, for example, making it possible for a single technician using simple hand tools to install a coupon assembly 200 adjacent the structure 2 and perform measurements using the installed coupon assembly 200. This may be repeated at multiple locations along the length of the structure 2.

Applicant has found that a relatively compact size for the coupon assembly may facilitate ease of assessing the cathodic protection of a cathodically protected structure 2. For example, embodiments of the coupon assembly having a compact dimension or diameter (e.g., based on the outer surface dimension of the first fitting, shown as 112 in FIGS. 3 and 212 in FIG. 5) may encounter fewer obstructions during installation. For some embodiments, Applicant has found that a coupon assembly not exceeding about 0.50 inches in diameter or dimension, for example, may make it possible for an individual technician to manually install a coupon assembly adjacent the structure 2 without the need for mechanical excavation equipment. For some embodiments, Applicant has found that a coupon assembly not exceeding about 1.0 inch in diameter or dimension, for example, may make it possible for an individual technician to manually install a coupon assembly adjacent the structure 2 without the need for mechanical excavation equipment. The individual technician may thereafter perform multiple measurements using the installed coupon assembly, and/or perform measurements at multiple locations along the length of the structure 2.

Figure 6:
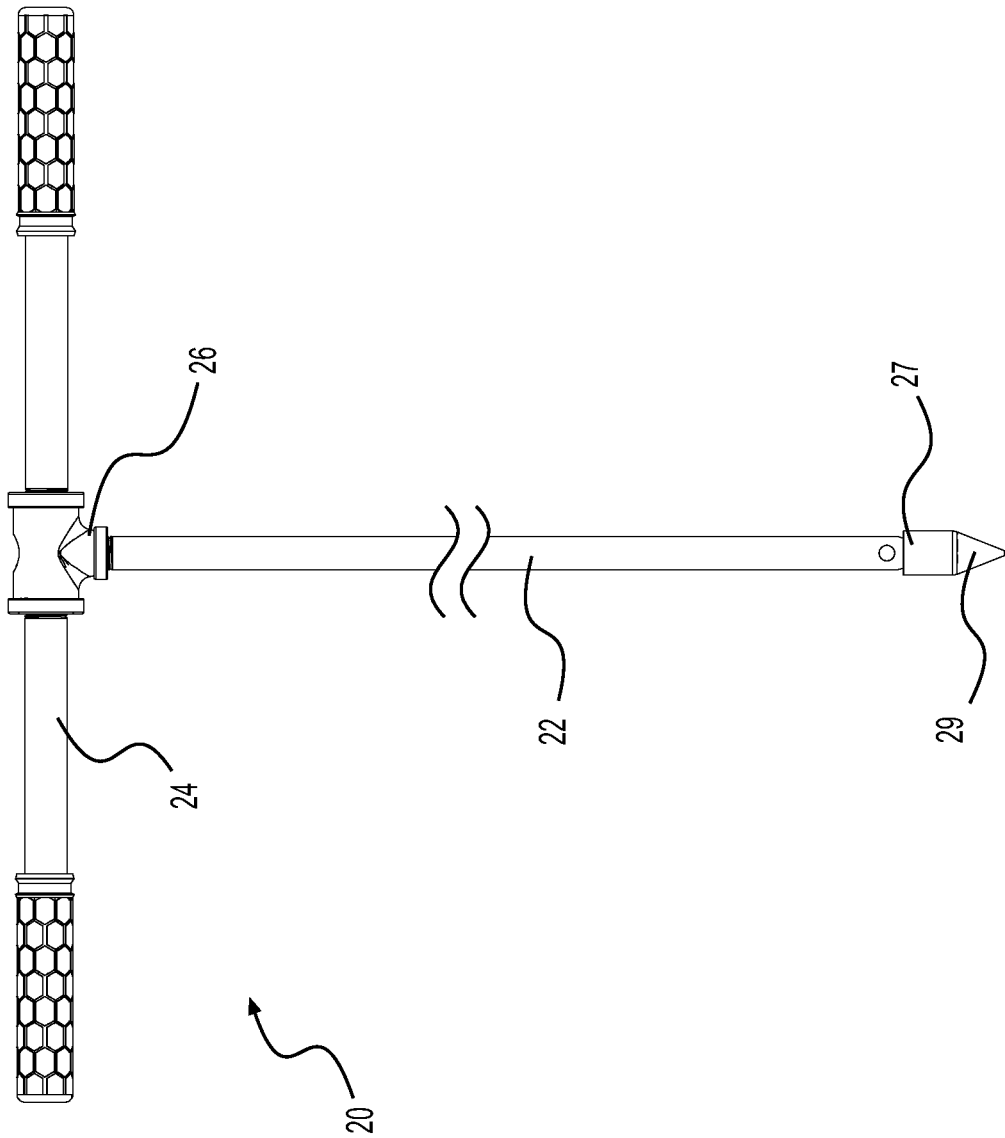
FIG. 6 is a schematic side view depicting an example probe rod fitted with an example driving tip, according to embodiments of the disclosure.

For example, according to some embodiments, an example coupon assembly 100 and/or 200, may be inserted into the ground (or into an aqueous environment) to a selected location and/or to a selected depth, such that the coupon assembly 100 and/or 200 is exposed in the same or similar soil or aqueous environmental conditions as the at least partially buried or submerged structure 2 being assessed. In some instances, the selected location and/or selected depth may be in the vicinity of, or close to, a less well-protected region of the structure 2. In some embodiments, to facilitate insertion of the coupon assembly 100 and/or 200 into the ground, a probe rod 20 or other penetrating device, such as the example probe rod 20 shown in FIG. 6, may be used to create a pilot hole 5 (see FIG. 1). For example, the probe rod 20 may be manually pushed into the ground using the leverage provided by grasping portion 24. The grasping portion 24 may be configured to facilitate a secure grip on the first rod end 26 of the probe rod 20, such that a technician may apply a downward force on the probe rod 20 and/or torque on the probe rod 20 about its axis to assist with driving the probe rod 20 into the ground to the selected depth. In some embodiments, the grasping portion 24 may include a T-handle or T-handle-like structure, facilitating a two-handed grip on the first rod end 26 of the probe rod 20. In some embodiments, the probe rod 20 may include driving tip 29 at the second rod end 27, for example, as shown in FIG. 6, to facilitate driving the probe rod 26 into the ground or soil 1 adjacent the structure 2. In some embodiments, the driving tip 29 may be selectively removable and/or replaceable with respect to the elongate member 22 of the probe rod 20. Consistent with some embodiments, a technician may be able to use a hammer, a mallet, and/or any similar hand tools, to force the driving tip 29 to the selected depth. In some embodiments, once the pilot hole 5 has been created to the selected depth and/or at the selected location, the probe rod 20 may be withdrawn, and the driving tip 29 may be removed, exposing an open end of the elongate rod member 22 for receipt of a coupon assembly 100 or 200, for example, consistent with coupon assemblies described herein. For example, using the probe rod 20 with the coupon assembly 100 or 200 mounted thereto as described herein, the coupon assembly 100 or 200 may be inserted into the pilot hole 5 (FIG. 1) to the selected depth and separated from the second rod end 27 of the probe rod 20 to remain in place adjacent the structure 2 during the assessment of the cathodic protection of the structure 2. For the next use, a driving tip 29 may be connected and/or secured to the second rod end 27 of the probe rod 20 for use to create another pilot hole 5 at another location.

Figure 7A:
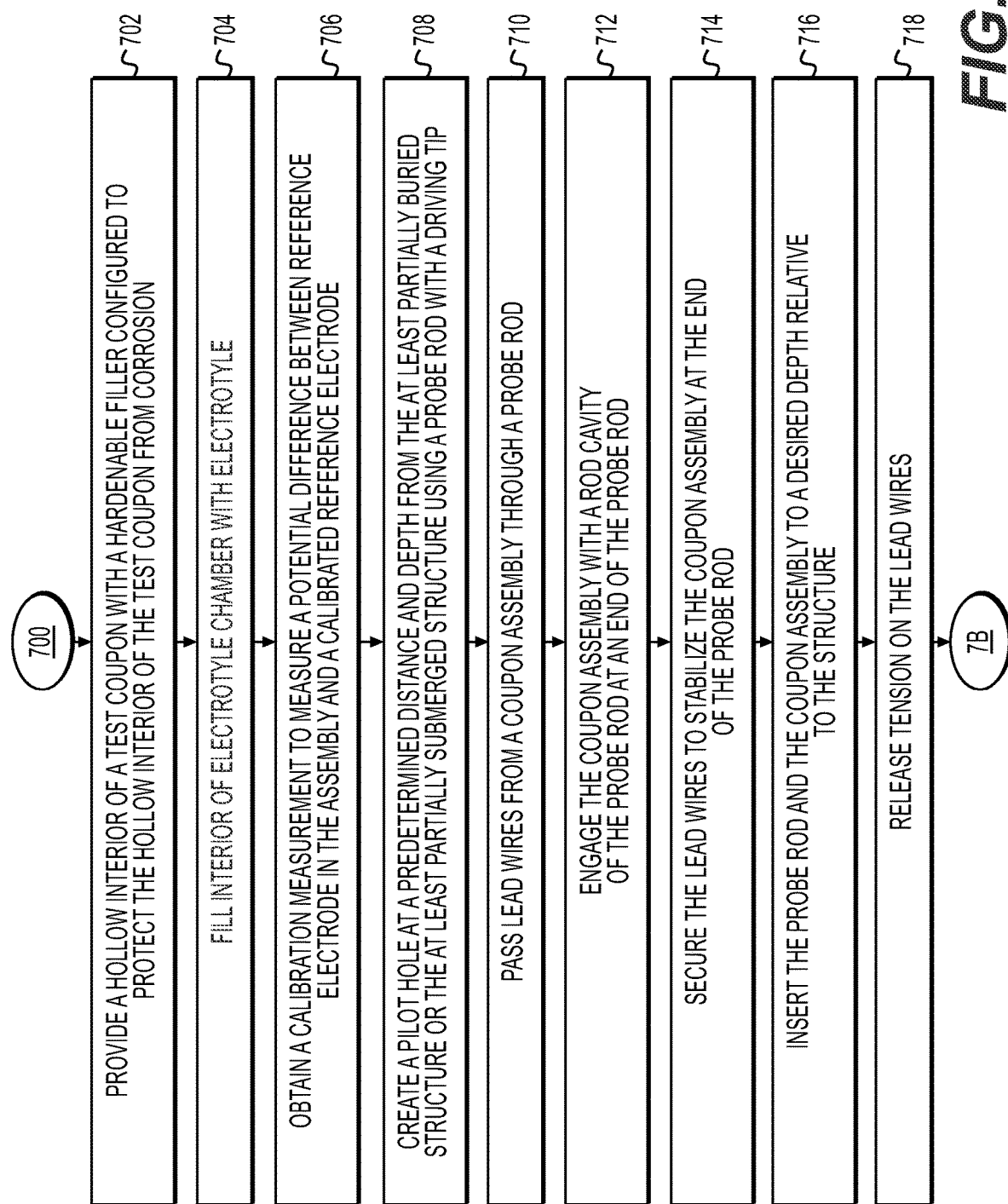
FIG. 7A is a block diagram of an example method for installing a cathodic protection coupon monitoring assembly, according to embodiments of the disclosure.
Figure 7B:
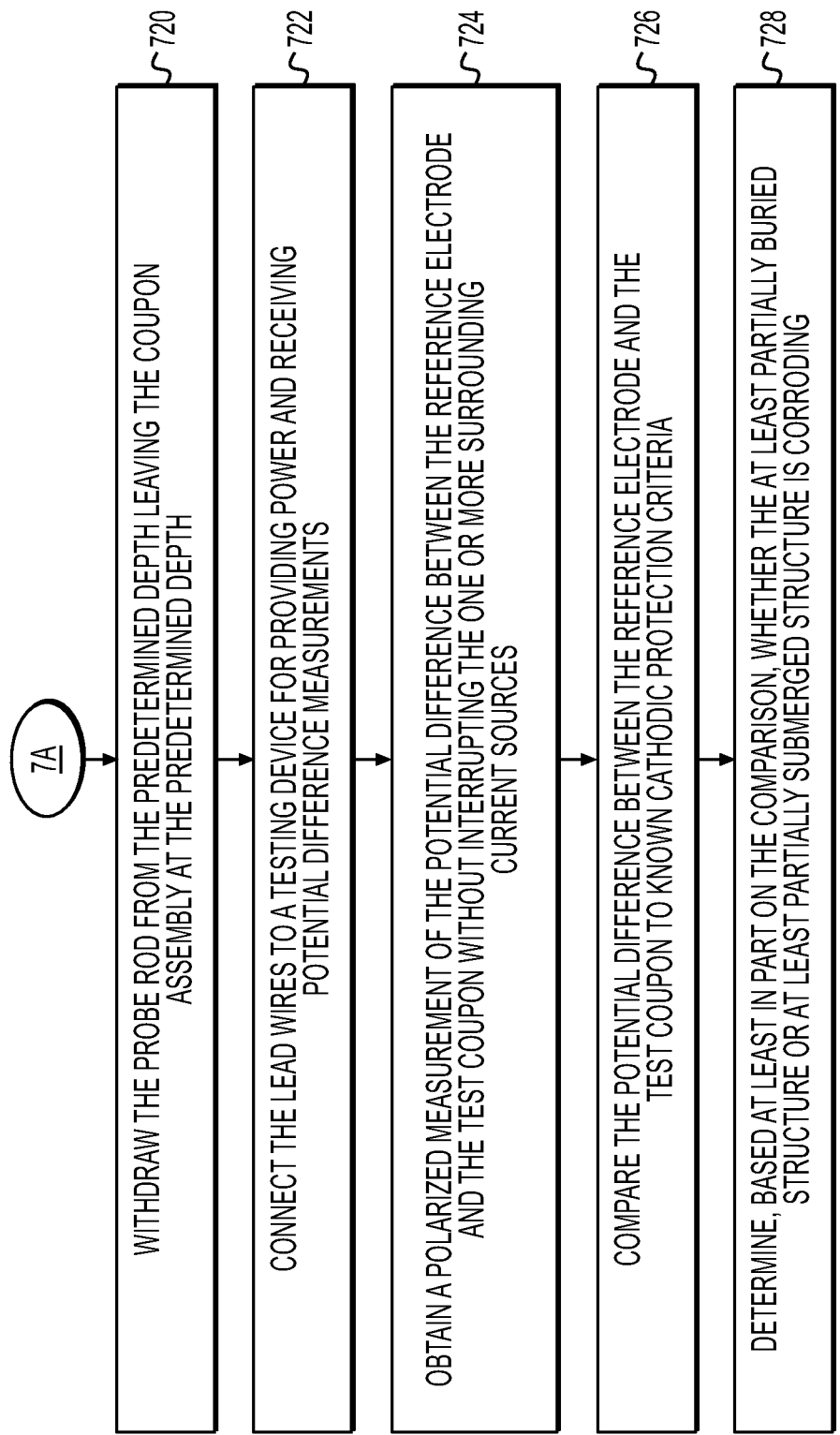
FIG. 7B is a continuation of the block diagram shown in FIG. 7A, according to embodiments of the disclosure.

FIG. 7A and FIG. 7B are a block diagram of an example method 700 for assembling and installing an example coupon assembly, according to embodiments of the disclosure, such as those described herein, as well as others. The example method 700 is illustrated as a collection of blocks in a logical flow graph, which represents a sequence of operations. The order in which the operations are described is not intended to be construed as a limitation, and any number of the described blocks may be combined in any order and/or in parallel to implement the method.

A cathodic protection monitoring assembly 3 may include a test coupon, which may include an electrically conductive coupon, for example, as described herein. When positioned, the location of the test coupon may be selected such that the surrounding environmental conditions (soil or fluid conditions) and/or characteristics are at least similar to, or substantially the same as, those in the vicinity of the cathodically protected structure. For example, the selected location may include soil having conditions and/or characteristics at least similar to native soil more distant from the structure, or in other examples, may more closely resemble backfill, compacted, and/or heterogeneous soils. In some embodiments, the test coupon may be positioned sufficiently close to the protected structure for which the cathodic protection is being monitored and/or measured, such that the location is representative of soil conditions and/or characteristics, such as, for example, temperature, pressure, water chemistry, chemical additives, and/or solids loading.

At 702, the example method 700 may include providing a hollow interior of a test coupon with a hardenable filler (e.g., epoxy, adhesive, and/or plaster), which secures the electrical connections and/or the components of the coupon assembly in a fixed position adjacent the test coupon, and/or protects the interior surface of the test coupon from corrosion. Prior to providing (e.g., filling) the hollow interior with hardenable filler, the hardenable filler may be placed in a low pressure environment such as a vacuum chamber to remove voids and/or air bubbles from the hardenable filler. The hardenable filler may thereafter be supplied to the hollow interior of the test coupon and allowed to harden or cure.

In some embodiments, an electrolyte may be supplied to the coupon assembly and hydrated. For example, in some embodiments, the example method 700, at 704 may include supplying the electrolyte into an inner cavity or recess at least partially defined by the coupon assembly. In some embodiments, the coupon assembly may include a removable cap, which may be separated from the rest of the coupon assembly to enable injection of the electrolyte, for example, on-site where the method is being performed, such as at a testing site. Thus, in some embodiments, the electrolyte may not be provided to the coupon assembly until immediately prior to being installed in the ground. As a result, the electrolyte has less opportunity to leak from the coupon assembly during storage or transport to the location of the testing. This also may extend the service life of the coupon assembly relative to a coupon assembly in which electrolyte is added to the coupon assembly during manufacturing of the components of the coupon assembly, for example, at a manufacturing facility remote from the testing location. In some embodiments, the electrolyte may be injected into the inner cavity or recess using a syringe or similar device, for example, as described previously herein. The coupon assembly may be checked for leaks, and water and/or another suitable fluid may be added to the electrolyte, or the coupon assembly may be at least partially immersed in water, such that water reaches the electrolyte.

In some embodiments, when the test coupon is electrically disconnected from the structure at a test station or voltage measuring device, "instant-off" potential difference measurements may be made on the test coupon, for example, without a need to interrupt any other current sources, including the cathodic protection current of the cathodic protection system. The test station as described herein may include components for monitoring the cathodic protection of the structure (e.g., voltages, currents, and/or other signals) such as, for example, a data logger, a computer, a network connection, etc.

In some embodiments, the coupon assembly may be relatively small. As a result, the coupon assembly may be installed adjacent to the protected structure without the use of mechanical digging implements or machines, such as, for example, a backhoe or excavator. For example, due to the nature of some structures, the use of mechanical digging implements or machines in close proximity to the structure may be prohibited and/or inadvisable to prevent damage to the structure. In some embodiments, the coupon assembly may be limited to components having small or compact dimensions, which may permit the coupon assembly to be installed near the structure without the use of mechanical digging implements or machines. This, in turn, may reduce or minimize potential measurement errors due, for example according to some embodiments, to the relatively close placement of the coupon assembly to the structure, thereby potentially mitigating, minimizing, or preventing interference from other current sources. Additionally, the small or compact dimensions of the coupon assembly may allow the distance between the test coupon and the reference electrode to be reduced or minimized, for example, without shielding the test coupon.

With the test coupon and reference electrode in electrical communication with the testing device and/or test station, the potential difference between the test coupon and reference electrode may be measured and output. In some embodiments, prior to connecting the lead wires to the testing device, the example method 700, at 706 may include manually measuring and/or recording the potential difference associated with the structure being cathodically protected, for example, using a separate reference electrode for later calibration without interrupting at least some of the surrounding current sources (e.g., without interrupting the cathodic protection or any other surrounding current sources). In some embodiments, these measurements may be used to determine the offset for the potential difference measurements, which may be measured with respect to the reference electrode of the coupon assembly. If desired, additional manual measurements of the potential difference using the separate reference electrode may be made before and/or after the connection of the coupon assembly to the testing device.

The example method 700, at 708, may include creating a pilot hole at a preselected distance and depth relative to the at least partially buried or submerged structure that is protected by a cathodic protection system. A probe rod including a driving tip, for example, as shown in FIG. 6, may be used by a technician to create the pilot hole, so that the coupon assembly may be inserted and positioned, for example, within a preselected distance of the cathodically protected structure. The preselected distance may range from about 6 inches to about 5 feet, from about one foot to about 4 feet, from about 1 foot to about 3 feet, from about 1 foot to about 2 feet, or from about 1 foot to about 1.5 feet, from an outer surface or wall of the cathodically protected structure. In some embodiments, the preselected distance may range from about 2 feet to about 10 feet, from about 2 feet to about 7 feet, from about 2 feet to about 6 feet, from about 2 feet to about 5 feet, or from about 2 feet to about 4 feet. In some embodiments, the preselected depth may generally correspond to a depth of the structure or a portion of the structure.

At 710, the example method 700 further may include passing lead wires for the coupon assembly, contained in a wire bundle, through a rod member of a probe rod, so the lead wires extend from an upper or first rod end of the rod member, for example, as shown in FIG. 1. An end of the wire bundle extending from the first rod end may remain above ground after the coupon assembly is inserted and positioned in the ground at a selected location and/or depth. The end of the wire bundle extending from the first rod end may be attached to a measuring device, for example, as described previously herein.

At 712, the example method 700 further may include engaging the coupon assembly with the rod cavity at an end of the probe rod. This may include receiving the end of the probe rod in a recess of the coupon assembly, inserting a portion of the coupon assembly into the rod cavity, or both. At 714, the example method 700 also may include holding and securing the wire bundle with the lead wires passing through the probe rod and applying tension on the wire bundle, which may help to maintain engagement between the coupon assembly and the end of the probe rod.

At 716, the example method 700 further may include, for example, while maintaining the tension, inserting the probe rod with the engaged coupon assembly into the pilot hole and to the preselected depth and location relative to the protected structure. For example, a technician may use a grasping portion of the probe rod to push the coupon assembly to the predetermined depth, which may correspond to the bottom of the pilot hole. At 718, the example method 700 also may include releasing the tension on the wire bundle, for example, to settle the coupon assembly at preselected depth.

The example method 700, at 720 (FIG. 7B), may include withdrawing the probe rod from the ground while leaving the coupon assembly at the preselected depth and location adjacent the structure. The probe rod may thereafter be completely separated from the coupon assembly, and the lead wires of the wire bundle may continue to extend from the ground at the opening of the pilot hole.

At 722, the example method 700 also may include routing the lead wires from the coupon assembly and connecting the lead wires to an electrical junction in communication with the testing device configured to facilitate measurement of potential differences detected by the coupon assembly. In some embodiments, the electrical junction may be in communication with a remote test station. In some embodiments, the electrical junction may be in communication with a remote test station via a hard-wired communications network and/or a wireless communications network, which may adhere to known hard-wired and/or wireless communication protocols. In some embodiments, during installation, the coupon assembly may be electrically connected to the at least partially buried or submerged structure and the anode of the associated cathodic protection system, for example, such that the coupon assembly is protected by the cathodic protection system. In some embodiments, a voltage measuring device of the test station may include one or more switching devices for selectively connecting and/or disconnecting a reference electrode to one terminal, while selectively connecting and/or disconnecting the structure connection from another terminal. In some embodiments, the test coupon and/or reference electrode may be independently isolated from other components in the cathodic protection system. For example, the test coupon may be energized and subsequently isolated from the cathodic protection system and the partially buried or submerged structure through a switching device, allowing a potential difference measurement to be made on the test coupon with respect to the reference electrode.

At 724, the example method 700 also may include taking one or more polarized measurements of the potential difference between the reference electrode and the test coupon, for example, without interrupting one or more of the surrounding current sources. For example, the potential difference may be sampled, and an averaged reading may be obtained. In some embodiments, a data logger may be used to record the raw data over a period of time. In some embodiments, the data may be transmitted using a network connection and may be stored in a remote database, for example, with appropriate identifying information for the location of the structure and coupon assembly, and/or the type of protective system.

At 726, the example method 700 further may include comparing the measured potential differences to known cathodic protection criteria for the known structure and cathodic protection system, for example, to assess the continuing operation of the cathodic protection system. At 728, the example method 700 also may include using this comparison and/or other relevant data to determine whether (and/or to what degree) the at least partially buried or submerged structure may be corroding.

This is a continuation of U.S. Non-Provisional application Ser. No. 17/886,178, filed Aug. 11, 2022, titled "ASSEMBLIES AND METHODS FOR MONITORING CATHODIC PROTECTION OF STRUCTURES," which is a divisional of U.S. Non-Provisional application Ser. No. 17/805,801, filed Jun. 7, 2022, titled "ASSEMBLIES AND METHODS FOR MONITORING CATHODIC PROTECTION OF STRUCTURES," now U.S. Pat. No. 11,447,877, issued Sep. 20, 2022, which claims priority to and the benefit of U.S. Provisional Application No. 63/365,102, filed May 20, 2022, titled "ASSEMBLIES AND METHODS FOR MONITORING CATHODIC PROTECTION OF STRUCTURES," and U.S. Provisional Application No. 63/260,622, filed Aug. 26, 2021, titled "MINIATURE IR ERROR FREE CATHODIC PROTECTION COUPON ASSEMBLY INSTALLED VIA PROBE," the disclosures of which are incorporated herein by reference.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways or configurations to accomplish the same objectives. Those skilled in the art should appreciate that the parameters and configurations described herein are exemplary and that actual parameters and/or configurations will depend on the specific application in which the systems, methods, and/or aspects or techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto, the disclosure may be practiced other than as specifically described.

Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further may be made thereto without departing from the spirit and scope of the present disclosure as set forth in the appended claims.

What is claimed is:

1. A method to install a cathodic protection coupon monitoring assembly, the method comprising:
    passing lead wires from a coupon assembly through a rod cavity of a probe rod, the coupon assembly including:
        a first fitting,
        an electrically conductive test coupon adjacent the first fitting,
        a reference electrode, and
        a second fitting defining a fitting chamber and positioned between a distal end of the coupon assembly and the electrically conductive test coupon, the reference electrode at least partially within the fitting chamber;
    engaging the coupon assembly with the probe rod;
    inserting the probe rod and the coupon assembly to a preselected depth;
    withdrawing the probe rod from the preselected depth so that the coupon assembly remains at the preselected depth; and
    connecting the lead wires to an electrical junction in communication with a testing device, thereby to facilitate measurement of potential differences detected by the coupon assembly.

2. The method of claim 1, wherein inserting the probe rod and the coupon assembly to the preselected depth comprises forming a pilot hole, and then inserting the probe rod and the coupon assembly into the pilot hole.

3. The method of claim 2, wherein the electrically conductive test coupon includes a hollow interior at least partially filled with a hardenable filler configured to protect the hollow interior of the electrically conductive test coupon from corrosion, and the method further comprising:
    forming the pilot hole in soil with the probe rod; and
    injecting water through one or more perforations in the probe rod, thereby to stabilize the soil surrounding the pilot hole.

4. The method of claim 1, further comprising:
    tensioning the lead wires to stabilize the coupon assembly at a distal rod end of the probe rod;
    releasing tension on the lead wires; and
    obtaining a calibration measurement to measure a potential difference between the reference electrode and one or more of: (a) an at least partially buried structure, or (b) an at least partially submerged structure without interrupting one or more surrounding current sources.

5. The method of claim 4, further comprising:
    obtaining a polarized measurement of the potential difference between the reference electrode and the electrically conductive test coupon without interrupting the one or more surrounding current sources;
    comparing the potential difference between the reference electrode and the electrically conductive test coupon to known cathodic protection criteria; and
    determining, based at least in part on the comparing, whether the at least partially buried structure or the at least partially submerged structure has corrosion associated therewith.

6. The method of claim 1, further comprising:
    removing a cap from the distal end of the coupon assembly;
    filling at least a portion of the fitting chamber with an electrolyte; and
    replacing the cap so as substantially to seal the electrolyte within the fitting chamber.

7. The method of claim 1, wherein a structure is at least partially buried in soil, the soil having one or more soil characteristics, and wherein the step of inserting the probe rod and the coupon assembly to the preselected depth comprises inserting the probe rod and the coupon assembly to a representative preselected depth, such that soil at the representative preselected depth has representative soil characteristics consistent with the one or more soil characteristics, the one or more soil characteristics comprising one or more of temperature, pressure, moisture content, chemistry, chemical additives, or solids loading.

8. A method to install a cathodic protection coupon monitoring assembly, the method comprising:
    passing lead wires from a coupon assembly through a cavity of a probe rod, the coupon assembly including:
        a first fitting,
        an electrically conductive test coupon adjacent the first fitting,
        a reference electrode, and
        a second fitting positioned between a distal end of the coupon assembly and the electrically conductive test coupon, the second fitting including a fitting chamber configured to be at least partially filled with electrolyte, and the reference electrode at least partially inserted within the fitting chamber;
    engaging the first fitting of the coupon assembly with a distal rod end of the probe rod;
    inserting the probe rod and the coupon assembly to one or more of a preselected depth or a preselected distance relative to a structure;
    withdrawing the probe rod from the one or more of the preselected depth or the preselected distance;
    leaving the coupon assembly at the one or more of the preselected depth or the preselected distance during the withdrawal of the probe rod; and
    connecting the lead wires to an electrical junction in communication with a testing device, thereby to facilitate measurement of potential differences detected by the coupon assembly.

9. The method of claim 8, wherein inserting the probe rod and the coupon assembly to the one or more of the preselected depth or the preselected distance comprises forming a pilot hole at a preselected distance from the structure, and then inserting the probe rod and the coupon assembly into the pilot hole.

10. The method of claim 9, wherein the electrically conductive test coupon includes a hollow interior that is at least partially filled with a hardenable filler configured to protect the hollow interior of the electrically conductive test coupon from corrosion, and the method further comprising:
    forming the pilot hole in soil with the probe rod; and
    injecting water through one or more perforations in the probe rod, thereby to stabilize the soil surrounding the pilot hole.

11. The method of claim 8, further comprising:
    tensioning the lead wires to stabilize the coupon assembly at the distal rod end of the probe rod;
    releasing tension on the lead wires; and
    obtaining a calibration measurement to measure a potential difference between the reference electrode and one or more of: (a) an at least partially buried structure, or (b) an at least partially submerged structure without interrupting one or more surrounding current sources.

12. The method of claim 11, further comprising:
obtaining a polarized measurement of the potential difference between the reference electrode and the electrically conductive test coupon without interrupting the one or more surrounding current sources;
comparing the potential difference between the reference electrode and the electrically conductive test coupon to known cathodic protection criteria; and
determining, based at least in part on the comparing, whether the at least partially buried structure or at least partially submerged structure has corrosion associated therewith.

13. The method of claim 12, wherein obtaining the polarized measurement comprises averaging a plurality of potential difference measurements over a selected time interval, and the method further comprising:
removing a cap from the distal end of the coupon assembly;
filling at least a portion of the fitting chamber with an electrolyte; and
replacing the cap so as substantially to seal the electrolyte within the fitting chamber, and
wherein the coupon assembly further includes a plug having a plug cavity, the second fitting including a proximal end having one or more holes that communicate with the fitting chamber, the proximal end of the second fitting sized to fit at least partially within the plug cavity, and
wherein the method further comprises wicking moisture from a surrounding environment at the one or more of the preselected depth or the preselected distance, through the plug, to the fitting chamber via the one or more holes after inserting the probe rod and the coupon assembly to the one or more of the preselected depth or the preselected distance.

* * * * *